(12) United States Patent
Mizuno et al.

(10) Patent No.: US 12,406,330 B2
(45) Date of Patent: Sep. 2, 2025

(54) ELECTRONIC APPARATUS, CONTROL METHOD OF ELECTRONIC APPARATUS, AND NON-TRANSITORY COMPUTER READABLE MEDIUM

(71) Applicant: CANON KABUSHIKI KAISHA, Tokyo (JP)

(72) Inventors: Takashi Mizuno, Tokyo (JP); Marina Miyaura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 18/168,656

(22) Filed: Feb. 14, 2023

(65) Prior Publication Data

US 2023/0281768 A1 Sep. 7, 2023

(30) Foreign Application Priority Data

Mar. 7, 2022 (JP) .................................. 2022-034284

(51) Int. Cl.
| | |
|---|---|
| *G06T 5/40* | (2006.01) |
| *G02B 13/06* | (2006.01) |
| *G06V 10/25* | (2022.01) |
| *H04N 13/302* | (2018.01) |

(52) U.S. Cl.
CPC ............... *G06T 5/40* (2013.01); *G02B 13/06* (2013.01); *G06V 10/25* (2022.01); *H04N 13/302* (2018.05)

(58) Field of Classification Search
CPC .......... G06T 5/40; G02B 13/06; G06V 10/25; H04N 13/302; H04N 13/106; H04N 13/139; H04N 13/156; H04N 13/296; H04N 13/178; H04N 13/218
See application file for complete search history.

(56) References Cited

U.S. PATENT DOCUMENTS

| | | | |
|---|---|---|---|
| 8,633,998 B2 * | 1/2014 | Hayashi | H04N 13/398 348/333.01 |
| 8,760,561 B2 * | 6/2014 | Haikin | G06F 16/583 348/222.1 |
| 8,773,567 B2 * | 7/2014 | Hitosuga | H04N 23/611 348/222.1 |
| 8,934,050 B2 * | 1/2015 | Imai | H04N 23/70 396/222 |
| 9,681,056 B2 * | 6/2017 | Nonaka | H04N 23/635 |
| 9,807,303 B2 * | 10/2017 | Ishida | H04N 23/675 |
| 11,153,485 B2 * | 10/2021 | Coupeté | H04N 5/145 |

(Continued)

FOREIGN PATENT DOCUMENTS

| | | |
|---|---|---|
| JP | 2004-120527 A | 4/2004 |
| JP | 2014-107799 A | 6/2014 |

*Primary Examiner* — Stephen R Koziol
*Assistant Examiner* — Joshua Chen
(74) *Attorney, Agent, or Firm* — Venable LLP

(57) ABSTRACT

An electronic apparatus according to the present invention includes: a processor; and a memory storing a program which, when executed by the processor, causes the electronic apparatus to: acquire an image in which a first image area captured through a first optical system and a second image area captured through a second optical system are arranged and information related to the first optical system; determine the first image area in the image from the information related to the first optical system; acquire a characteristic value of the determined first image area from the image; and perform control to display the characteristic value.

13 Claims, 12 Drawing Sheets

(56) References Cited

U.S. PATENT DOCUMENTS

| | | | |
|---|---|---|---|
| 11,284,014 B2* | 3/2022 | Kawaguchi | H04N 23/90 |
| 2008/0123953 A1* | 5/2008 | Anderson | H04N 23/631 |
| | | | 382/168 |
| 2011/0109727 A1* | 5/2011 | Matsuura | H04N 23/73 |
| | | | 348/47 |

* cited by examiner

FIG. 6A

| LENS DESIGNED VALUES |
| --- |
| LENS INDIVIDUAL VALUES |
| LENS FLAG |
| LENS FOCAL LENGTH |
| LENS TEMPERATURE |

FIG. 6B

| | |
| --- | --- |
| LENS DESIGNED VALUES | IMAGE CIRCLE POSITION |
| | IMAGE CIRCLE DIAMETER |
| | ANGLE OF VIEW |
| | DISTORTION CORRECTION COEFFICIENT |
| LENS INDIVIDUAL VALUES | IMAGE CIRCLE POSITION SHIFT |
| | OPTICAL AXIS TILT |
| | IMAGE MAGNIFICATION DEVIATION |

FIG. 6C

| CAMERA RECORDING AREA INFORMATION |
| --- |
| IN-CAMERA ACCELEROMETER INFORMATION |
| RIGHT EXPOSURE CORRECTION INFORMATION |

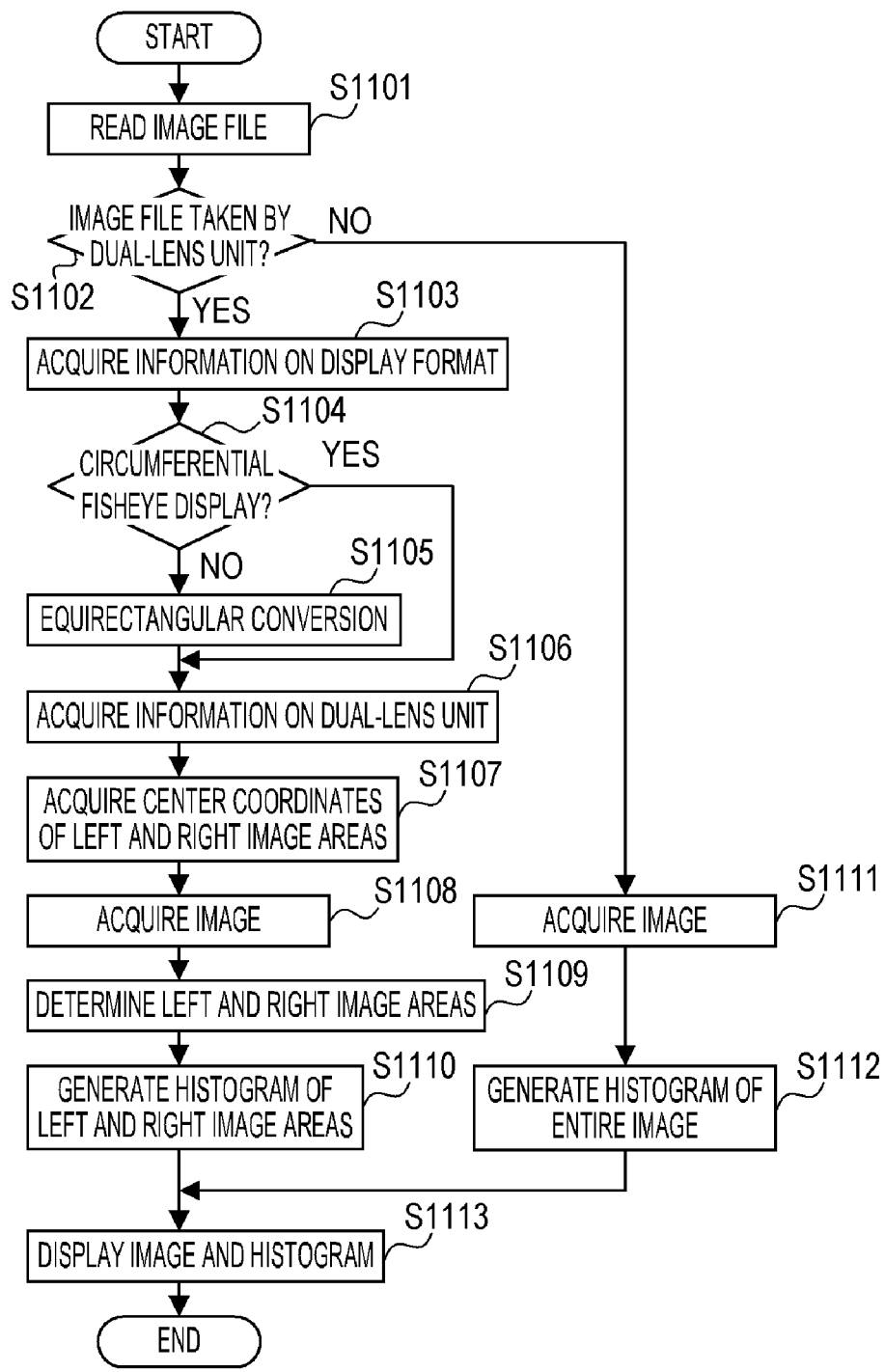

ELECTRONIC APPARATUS, CONTROL METHOD OF ELECTRONIC APPARATUS, AND NON-TRANSITORY COMPUTER READABLE MEDIUM

BACKGROUND OF THE INVENTION

Field of the Invention

The present invention relates to an electronic apparatus, a control method of the electronic apparatus, and a non-transitory computer-readable medium.

Description of the Related Art

Japanese Patent Application Publication No. 2014-107799 discloses an imaging device that displays a waveform monitor on the basis of captured images. Japanese Patent Application Publication No. 2004-120527 discloses an imaging device that captures stereoscopic images using two optical systems.

However, when mounted with a lens unit having a plurality of optical systems, the conventional imaging devices with a detachable lens unit are not capable of displaying a preferred characteristic value as a characteristic value (such as a characteristic value indicated in a form of a waveform monitor) based on captured images.

SUMMARY OF THE INVENTION

The present invention provides a technique that allows a preferred characteristic value based on a captured image to be displayed.

An electronic apparatus according to the present invention includes: a processor; and a memory storing a program which, when executed by the processor, causes the electronic apparatus to: acquire an image in which a first image area captured through a first optical system and a second image area captured through a second optical system are arranged and information related to the first optical system; determine the first image area in the image from the information related to the first optical system; acquire a characteristic value of the determined first image area from the image; and perform control to display the characteristic value.

Further features of the present invention will become apparent from the following description of exemplary embodiments with reference to the attached drawings.

BRIEF DESCRIPTION OF THE DRAWINGS

FIG. 6A schematically indicates lens information;
FIG. 6B schematically indicates lens designed values and lens individual values;
FIG. 6C schematically indicates camera information;
FIG. 11 is a flowchart for illustrating histogram display processing according to a second embodiment of the invention.

DESCRIPTION OF THE EMBODIMENTS

Hereinafter, embodiments of the present invention will be described in conjunction with the accompanying drawings. According to the embodiments, a digital camera (imaging device) will be described as an electronic device by way of illustration. When mounted with a lens unit having a plurality of optical systems, a conventional digital camera with a detachable lens unit cannot indicate a preferred characteristic value as a characteristic value based on a captured image (a characteristic value indicated for example indicated in a form of a waveform monitor). Specifically, similarly to the case in which a lens unit with one optical system is mounted, the characteristic values of the entire captured image are indicated, and the user cannot check the characteristic values (such as luminance distribution and color distribution) of the portion corresponding to each of optical system in detail. Therefore, according to the embodiments, a preferred characteristic value based on a captured image can be displayed.

The digital camera according to the embodiments can acquire one image (dual-lens image, binocular image) including a left image area and a right image area with a prescribed parallax in the left-right direction and display the image on the display unit. The digital camera can also apply prescribed image processing to a target area in the image displayed on the display unit. The prescribed image processing may include detecting characteristic values such as luminance distribution and chromaticity distribution within a target area and generating for example a histogram, a waveform monitor, or a vector scope. In the following, an example of how a histogram is generated and displayed on the display unit will be described. The digital camera according to the embodiments displays the characteristic values of an image in the form of a histogram on the display unit in response to a histogram display instruction.

First Embodiment

The processing of displaying a histogram of the left image area of a dual-lens image taken with a dual circumferential fisheye lens according to a first embodiment of the invention will be described. The processing of displaying a histogram of the right image area in the dual-lens image is the same as the processing of displaying a histogram of the left image area in the dual-lens image.

Figure 1A:
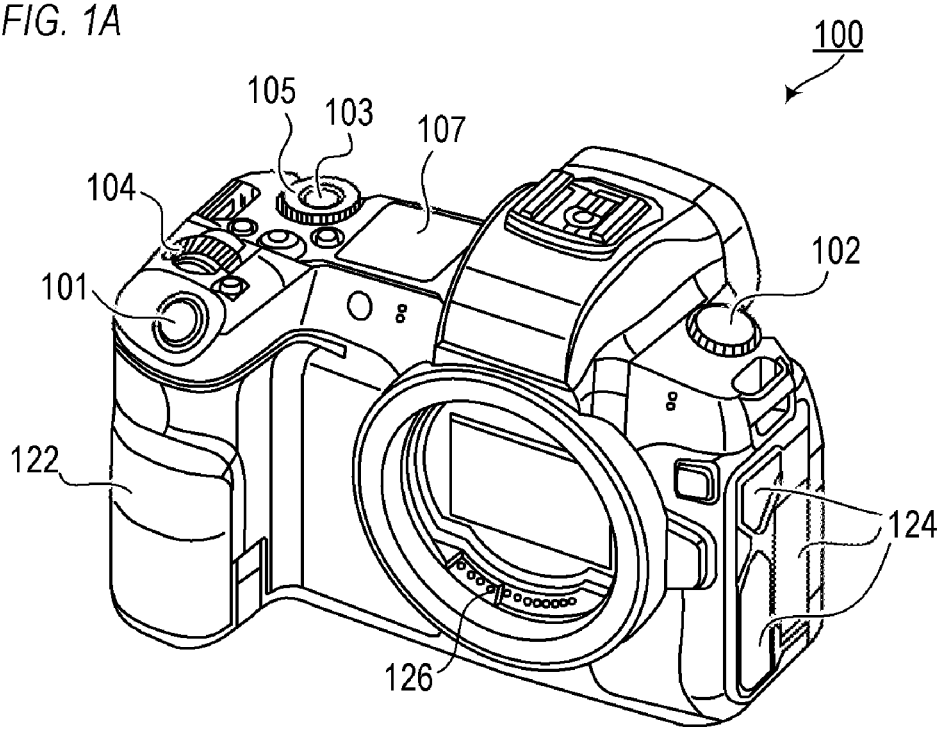
FIGS. 1A and 1B are external views of a camera.
Figure 1B:
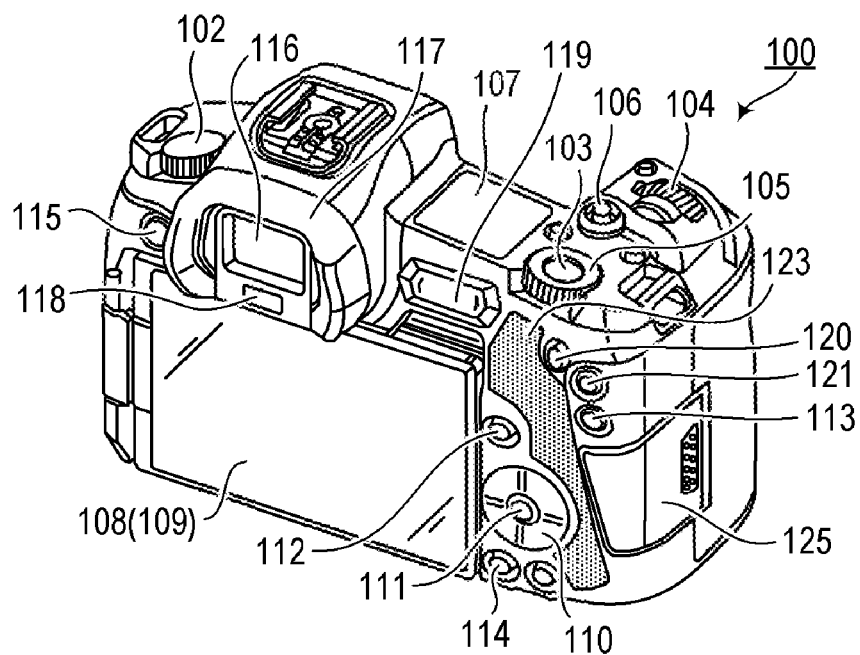

FIGS. 1A and 1B are external views of a digital camera (camera) 100 according to the first embodiment. FIG. 1A is a perspective view of the camera 100 from the front side, and FIG. 1B is a perspective view of the camera 100 from the rear side.

The camera 100 has, on the upper surface, a shutter button 101, a power supply switch 102, a mode selector switch 103, a main electronic dial 104, a sub-electronic dial 105, a moving image button 106, and an outside viewfinder display unit 107. The shutter button 101 is an operating member for giving preparation or shooting instructions. The power supply switch 102 is an operating member for turning on/off the camera 100. The mode selector switch 103 is an operating member for switching between various modes. The main electronic dial 104 is a rotary operation member for changing setting values such as a shutter speed and an aperture value. The sub-electronic dial 105 is a rotary operation member for moving a selection frame (cursor) and feeding images. The moving image button 106 is an operation member for starting and stopping moving image recording. The outside viewfinder display unit 107 displays various setting values such as a shutter speed and an aperture value.

The camera 100 has, at the back side, a display unit 108, a touch panel 109, a direction key 110, a SET button 111, an AE lock button 112, a magnifying button 113, a playback button 114, a menu button 115, an eyepiece 116, an eye approach detection unit 118, a touch bar 119, a multi-controller 120, and a display mode switching button 121. The display unit 108 displays images and various kinds of information. The touch panel 109 is an operation member that detects touch operation on the display surface (touch operation surface) of the display unit 108. The direction key 110 is an operation member having keys that can be pressed to indicate up, down, left, and right directions (four direction keys). The processing corresponding to the pressed position of the direction key 110 can be performed. The SET button 111 is mainly used to determine a selected item. The AE lock button 112 is used to lock the exposure state while the camera is in a shooting standby mode. The magnifying button 113 is used to switch on/off the magnifying mode in live view display (LV display) in the shooting mode. When the magnifying mode is on, the live view image (LV image) is enlarged or reduced by operating the main electronic dial 104. The magnifying button 113 is used to enlarge a playback image or increase the magnification rate in the playback mode. The playback button 114 is an operating member for switching between the shooting mode and the playback mode. By pressing the playback button 114 in the shooting mode, the camera switches to the playback mode, and the latest image among images recorded on a recording medium 227 (which will be described) can be displayed on the display unit 108.

The menu button 115 is an operation member that is pressed to display a menu screen on the display unit 108 that allows various settings to be made. The user can intuitively make various settings using the menu screen displayed on the display unit 108, the direction keys 110, and the SET button 111. The eyepiece 116 is the part on which the user puts the eye to look through the eyepiece viewfinder (peep viewfinder) 117. The user can view the image displayed on an EVF 217 (Electronic View Finder), which will be described, inside the camera 100 through the eyepiece 116. The eye approach detection unit 118 is a sensor that detects whether the user has approached/put the eye at the eyepiece 116 (eyepiece viewfinder 117).

The touch bar 119 is a line-shaped touch operation member (line touch sensor) capable of accepting touch operation. The touch bar 119 is provided in a position that is touch-operable (touchable) with the thumb of the right hand when the grip part 122 is held with the right hand (by the little finger, ring finger, and middle finger of the right hand) so that the shutter button 101 can be pressed with the index finger of the right hand. In other words, the touch bar 119 is operable in a state (shooting orientation) where the camera is held to allow the user to look into the eyepiece viewfinder 117, look through the eyepiece 116, and press the shutter button 101 at any time. The touch bar 119 can accept operation such as tapping operation on the touch bar 119 (touch and release without moving the touch position within a prescribed period of time) and sliding operation to the left or right (touch and then move the touch position while keeping the touch). The touch bar 119 is an operation member different from the touch panel 109 and does not have a display function. The touch bar 119 functions, for example, as a multi-function bar (M-Fn bar) to which various functions can be assigned.

The multi-controller 120 is configured to be pushed down in a 360-degree direction. By pushing down the multi-controller 120, the user can indicate eight directions such as up, down, left, and right. The user can also instruct activation of any of the functions assigned to the multi-controller 120 by pushing the multi-controller 120 down. The display mode switching button 121 is an operation member for switching between modes for displaying images (including live images) and shooting information displayed on the display unit 108 and the EVF 217. Each time the display mode switching button 121 is pressed, the display mode is switched, allowing the user to view images and information in the desired display mode.

The camera 100 also has a grip part 122, a thumb rest part 123, a terminal cover 124, a lid 125, and a communication terminal 126. The grip part 122 is a holder formed in a shape easy for the user to grasp with the right hand when the user holds the camera 100. The shutter button 101 and the main electronic dial 104 are in such positions that these members can be operated with the index finger of the right hand when the user holds the camera 100 by grasping the grip part 122 with the little finger, ring finger, and middle finger of the right hand. In the same state, the sub-electronic dial 105 and the touch bar 119 are positioned so that these members can be operated by the thumb of the right finger. The thumb rest part 123 (in a thumb standby position) is a grip part provided in a location at the rear side of the camera 100 where the thumb of the right hand holding the grip part 122 can be easily placed while not operating any of the operation members. The thumb rest part 123 may be made of a rubber material to enhance the holding power (gripping feeling). The terminal cover 124 protects connectors such as connection cables that connect the camera 100 to external devices (external equipment). The lid 125 protects the recording medium 227 and a slot by closing the slot for storing the recording medium 227 which will be described. The communication terminal 126 is a terminal for communication with the side of the lens unit (a lens unit 200 or a lens unit 300 which will be described) that can be provided detachably from the camera 100.

Figure 2:
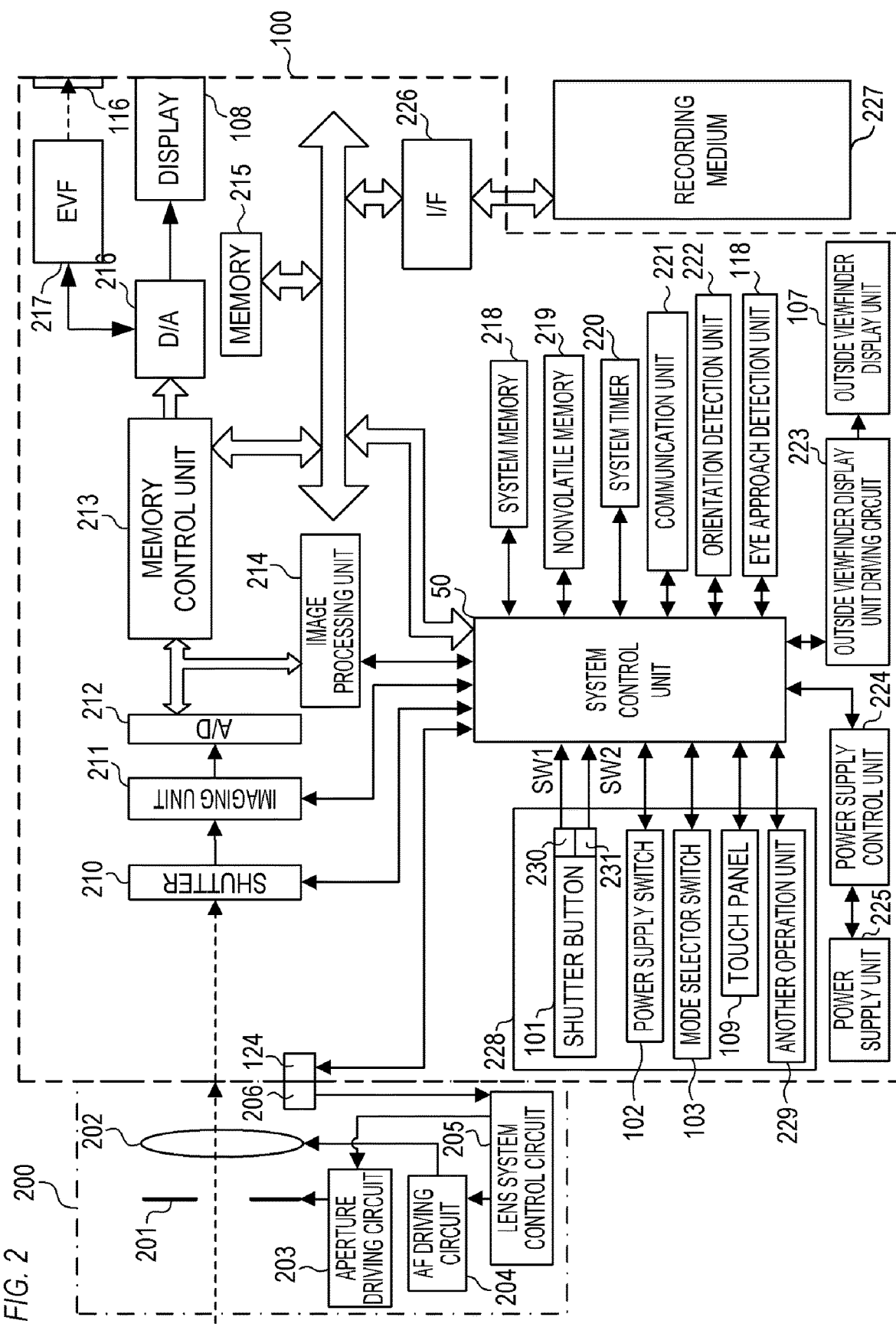
FIG. 2 is a block diagram of the configuration of the camera.

FIG. 2 is a block diagram of an exemplary configuration of the camera 100. The same elements as those in FIGS. 1A and 1B are denoted by the same reference characters as those in FIGS. 1A and 1B, and their description will not be provided. In FIG. 2, the lens unit 200 is mounted to the camera 100.

First, the lens unit 200 will be described. The lens unit 200 is a type of interchangeable lens unit that can be attached/detached to/from the camera 100. The lens unit 200 is a single-lens unit (monocular lens unit) and is an example of a normal lens unit. The lens unit 200 has an aperture 201, a lens 202, an aperture driving circuit 203, an AF (auto focus) driving circuit 204, a lens system control circuit 205, and a communication terminal 206.

The aperture 201 has an adjustable opening size. The lens 202 includes multiple lenses. The aperture driving circuit 203 adjusts the quantity of light by controlling the opening size of the aperture 201. The AF driving circuit 204 drives and focuses the lens 202. The lens system control circuit 205 controls the aperture driving circuit 203, the AF driving circuit 204, and other elements in response to instructions from the system control unit 50 which will be described. The lens system control circuit 205 controls the aperture 201 through the aperture driving circuit 203 and focuses the lens 202 by changing the position of the lens through the AF driving circuit 204. The lens system control circuit 205 can communicate with the camera 100. Specifically, communication is performed through the communication terminal 206 of the lens unit 200 and the communication terminal 126 of the camera 100. The communication terminal 206 is a terminal for the lens unit 200 to communicate with the side of the camera 100.

Next, the camera 100 will be described. The camera 100 has a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal plane shutter that can freely control the exposure time of the imaging unit 211 in response to an instruction form the system control unit 50. The imaging unit 211 is an imaging device (image sensor) including a CCD that converts an optical image into an electrical signal and a CMOS device. The imaging unit 211 may have an imaging plane phase difference sensor that outputs defocus amount information to the system control unit 50. The A/D converter 212 converts analog signals output from the imaging unit 211 into digital signals. The image processing unit 214 performs prescribed processing (such as pixel interpolation, resizing processing such as shrinking, and color conversion processing) on data from the A/D converter 212 or the memory control unit 213. The image processing unit 214 performs prescribed arithmetic processing using captured image data, and the system control unit 50 performs exposure control and distance measurement control on the basis of the results of the calculations obtained. This processing includes TTL (through-the-lens) AF processing, AE (auto exposure) processing, and EF (flash pre-flash) processing. Furthermore, the image processing unit 214 performs prescribed arithmetic processing using the captured image data, and the system control unit 50 performs TTL AWB (auto white balance) processing on the basis of the obtained calculation result.

The image data from the A/D converter 212 is written in the memory 215 through the image processing unit 214 and the memory control unit 213. Alternatively, image data from the A/D converter 212 is written in the memory 215 through the memory control unit 213 without going through the image processing unit 214. The memory 215 stores image data obtained by the imaging unit 211 and converted to digital data by the A/D converter 212 and image data to be displayed on the display unit 108 and EVF 217. The memory 215 has sufficient storage capacity to store a prescribed number of still images and a prescribed length of moving images and sound. The memory 215 also serves as the memory for displaying images (video memory).

The D/A converter 216 converts the image data for display stored in the memory 215 into analog signals and supplies the signals to the display unit 108 and the EVF 217. Therefore, the image data for display written in memory 215 is displayed on the display unit 108 or the EVF 217 through the D/A converter 216. The display unit 108 and the EVF 217 carry out display according to the analog signal from the D/A converter 216. The display unit 108 and the EVF 217 are, for example, LCD or organic EL displays. Digital signals A/D-converted by the A/D converter 212 and stored in the memory 215 are converted to analog signals by the D/A converter 216 and sequentially transferred to the display unit 108 and the EVF 217 for display, so that live-view display is performed.

The system control unit 50 includes at least one processor and/or at least one circuit. More specifically, the system control unit 50 may be a processor, a circuit, or a combination of a processor and a circuit. The system control unit 50 controls the entire camera 100. The system control unit 50 executes a program recorded in a nonvolatile memory 219 to realize each processing in the flowchart which will be described. The system control unit 50 also performs display control for example by controlling the memory 215, the D/A converter 216, the display unit 108, and the EVF 217. The system control unit 50 can identify the type of lens unit mounted to the camera 100 by communicating through the communication terminal 126 and the communication terminal 206.

The camera 100 also has a system memory 218, the nonvolatile memory 219, a system timer 220, a communication unit 221, an orientation detection unit 222, and the eye approach detection unit 118.

For example, a RAM is used as the system memory 218. In the system memory 218, constants, variables, and programs read from the nonvolatile memory 219 for the operation of the system control unit 50 are deployed. The nonvolatile memory 219 is electrically erasable and recordable memory, and an EEPROM, for example, is used as the nonvolatile memory 219. In the nonvolatile memory 219, constants, programs, etc. for the operation of the system control unit 50 are recorded. The program here is a program for executing the flowchart which will be described. The system timer 220 is a timekeeping unit that measures the time used for various kinds of control and the time of the built-in clock. The communication unit 221 transmits and receives video and audio signals to and from external devices connected by wirelessly or through wired cables. The communication unit 221 can also be connected to a wireless LAN (Local Area Network) or the Internet. The communication unit 221 can also communicate with external devices through Bluetooth® and Bluetooth Low Energy. The communication unit 221 can transmit images (including live images) captured by the imaging unit 211 and images recorded on the recording medium 227, and can receive images and various other kinds of information from external devices. The orientation detection unit 222 detects the orientation (tilt) of the camera 100 relative to the direction of gravity. On the basis of the orientation detected by the orientation detection unit 222, the tilt angle of the camera 100 in the horizontal (left/right) or vertical (up/down; front/back) direction can be detected. On the basis of the orientation detected by the orientation detection unit 222, it is possible to determine whether the image captured by the imaging unit 211 is an image captured with the camera 100 held horizontally or vertically. The system control unit 50 can add orientation information according to the orientation detected by the orientation detection unit 222 to the image file of the image captured by the imaging unit 211 or rotate the image according to the detected orientation. The orientation detection unit 222 can also be used to detect the movement of the camera 100 (such as panning, tilting, lifting, and whether it is stationary). For example, an acceleration sensor or a gyro sensor can be used for the orientation detection unit 222.

The eye approach detection unit 118 can detect some object approaching to the eyepiece 116 (eyepiece viewfinder 117). For example, an infrared proximity sensor can be used for the eye approach detection unit 118. When an object approaches, infrared light projected from the light emitting part of the eye approach detection unit 118 is reflected by the object and received by the light receiving part of the infrared proximity sensor. The distance from the eyepiece 116 to the object can be determined by the amount of received infrared light. In this way, the eye approach detection unit 118 performs eye approach detection to detect the distance of how close the object is to the eyepiece 116. The eye approach detection unit 118 is an eyepiece detection sensor that detects the approach (approaching eye) and separation (separating eye) of an eye (object) to and from the eyepiece 116. When an object approaching within a prescribed distance to the eyepiece 116 is detected from a non-approaching state (non-proximity state), the eye approach is detected. Meanwhile, when an object, the approach of which has been detected moves away from the eyepiece by a prescribed distance or more from an approaching state (proximity state), the separation of the eye is detected. The threshold for detecting the eye approaching to the eyepiece and the threshold for detecting the eye moving away from the eyepiece may be different for example by providing hysteresis. After the eye approach is detected, it is assumed that the eye remains in the approaching state until the separation of the eye is detected. After the separation of the eye is detected, it is assumed that the eye continues to be in a non-approaching state until the eye approach is detected. The system control unit 50 switches the display (display state)/non-display (non-display state) of the display unit 108 and the EVF 217 according to the state detected by the eye approach detection unit 118. Specifically, when the camera is at least in a standby state for shooting and the switching setting for the display destination is set to auto switching, the display unit 108 is turned on as the display destination and the EVF 217 is set to non-display in the non-approaching state. In the approaching state, the EVF 217 is on as the display destination, and the display unit 108 is set to a non-display state. The eye approach detection unit 118 is not limited to the infrared proximity sensor, and any other sensor may be used for the eye approach detection unit 118 if the sensor can detect a state that can be considered as an approaching state.

The camera 100 also has the outside viewfinder display unit 107, an outside viewfinder display unit driving circuit 223, a power supply control unit 224, a power supply unit 225, a recording medium I/F 226, and an operation unit 228.

The outside viewfinder display unit 107 is driven by the outside viewfinder display unit driving circuit 223 and displays various setting values for the camera 100 such as a shutter speed and an aperture. The power supply control unit 224 includes a battery detection circuit, a DC-DC converter, and a switch circuit that switches the block to be energized, and detects whether a battery is installed, the type of battery, and the remaining battery level. The power supply control unit 224 controls the DC-DC converter on the basis of the detection result and an instruction from the system control unit 50, and supplies required voltage to various parts including the recording medium 227 for a required period. The power supply unit 225 is a primary battery such as alkaline and lithium batteries, a secondary battery such as NiCd, NiMH, and Li batteries, or an AC adapter. The recording medium I/F 226 is an interface to a recording medium 227 such as a memory card and a hard disk. The recording medium 227 is for example a memory card for recording captured images and may include a semiconductor memory and a magnetic disk. The recording medium 227 may be removable from the camera 100 or may be built into the camera 100.

The operation unit 228 is an input unit that accepts operation from the user (user operation) and is used to input various instructions to the system control unit 50. The operation unit 228 includes the shutter button 101, the power supply switch 102, the mode selector switch 103, the touch panel 109, and another operation unit 229. The operation unit 229 include the main electronic dial 104, the sub-electronic dial 105, the moving image button 106, the direction keys 110, the SET button 111, the AE lock button 112, the magnifying button 113, the playback button 114, the menu button 115, and the touch bar 119.

The shutter button 101 has a first shutter switch 230 and a second shutter switch 231. The first shutter switch 230 is turned on during operation of the shutter button 101 in response to so-called half-press (an instruction to prepare for shooting), and outputs a first shutter switch signal SW1. The system control unit 50 starts shooting preparation processing such as AF processing, AE processing, AWB processing, and EF processing in response to the first shutter switch signal SW1. The second shutter switch 231 is turned on upon completion of the operation of the shutter button 101 or in response to so-called full press (a shooting instruction) and outputs a second shutter switch signal SW2. In response to the second shutter switch signal SW2, the system control unit 50 starts a series of photographic processing steps from reading a signal from the imaging unit 211 to generating an image file including the captured image and writing the file in the recording medium 227.

The mode selector switch 103 switches the operation mode of the system control unit 50 for example to a still image shooting mode, a motion image shooting mode, and a playback mode. The still image shooting mode includes an auto shooting mode, an auto scene determination mode, a manual mode, an aperture priority mode (Av mode), a shutter speed priority mode (Tv mode), and a program AE mode (P mode). There is also a various scene mode which has shooting settings for different shooting scenes and a custom mode. The user can directly switch the mode to any of the above shooting modes with the mode selector switch 103. Alternatively, the user can selectively switch the mode to any of the multiple modes displayed using the operation unit 228 after switching to the shooting mode list screen with the mode selector switch 103. Similarly, the video shooting mode may include multiple modes.

The touch panel 109 is a touch sensor that detects various kinds of touch operation on the display surface of the display unit 108 (the operation surface of the touch panel 109). The touch panel 109 and the display unit 108 can be integrally configured. For example, the touch panel 109 may be mounted on the upper layer of the display surface of the display unit 108 so that the light transmittance does not interfere with the display by the display unit 108. Input coordinates on the touch panel 109 are then associated with display coordinates on the display surface of the display unit 108. In this way, a GUI (graphical user interface) can be configured as if the user can directly manipulate the screen displayed on the display unit 108. The touch panel 109 can use any of various methods including resistive, capacitive, surface acoustic wave, infrared, electromagnetic induction, image recognition, and optical sensor methods. Depending on the method, touch is detected in response to contact with the touch panel 109 or by the proximity of a finger or pen to the touch panel 109 and any method can be used.

The system control unit 50 can detect the following kinds of operation with respect to or states of the touch panel 109.

A finger or pen that has not touched the touch panel 109 newly touching the touch panel 109, i.e., the start of touching (hereinafter referred to as "Touch-Down").

Touching the touch panel 109 with a finger or pen (hereinafter referred to as "Touch-On").

A finger or pen moving while touching the touch panel 109 (hereinafter referred to as "Touch-Move").

A finger or pen that has touched the touch panel 109 is apart (released) from the touch panel 109, i.e., the end of touching (hereinafter referred to as "Touch-Up").

There is nothing touching the touch panel 109 (hereinafter referred to as "Touch-Off").

When Touch-Down is detected, Touch-On is detected at the same time. After Touch-Down, Touch-On usually continues to be detected unless Touch-Up is detected. When Touch-Move is detected, Touch-On is also detected at the same time. Even if Touch-On is detected, Touch-Move is not detected if the touch position has not moved. After all fingers and pens that have touched are detected to have touched up, Touch-Off is detected.

These kinds of operation/states and the position coordinates of the fingers and pens touching on the touch panel 109 are notified to the system control unit 50 through an internal bus. The system control unit 50 determines what kind of operation (touch operation) has been performed on the touch panel 109 on the basis of the notified information. For Touch-Move, the direction of movement of a finger or pen moving on the touch panel 109 can also be determined for each of vertical and horizontal components on the touch panel 109 on the basis of changes in position coordinates. If Touch-Move over a prescribed distance is detected, it is determined that slide operation has been performed. An operation such as touching a finger on the touch panel 109, moving it quickly for a certain distance, and then releasing it is called flick. In other words, flick is operation in which a finger quickly traces on the touch panel 109 as if flicking it. When Touch-Move is detected over a prescribed distance and at a prescribed speed, and Touch-Up is detected directly, it is determined that flick has been performed (it can be determined that flick has followed slide operation). Furthermore, touch operation in which multiple points (e.g., two points) are touched (multi-touch) to bring their touch positions closer to each other is called pinch-in, and touch operation in which their touch positions are moved away from each other is called pinch-out. Pinch-out and pinch-in are collectively referred to as pinch operation (or simply pinch).

Figure 3:
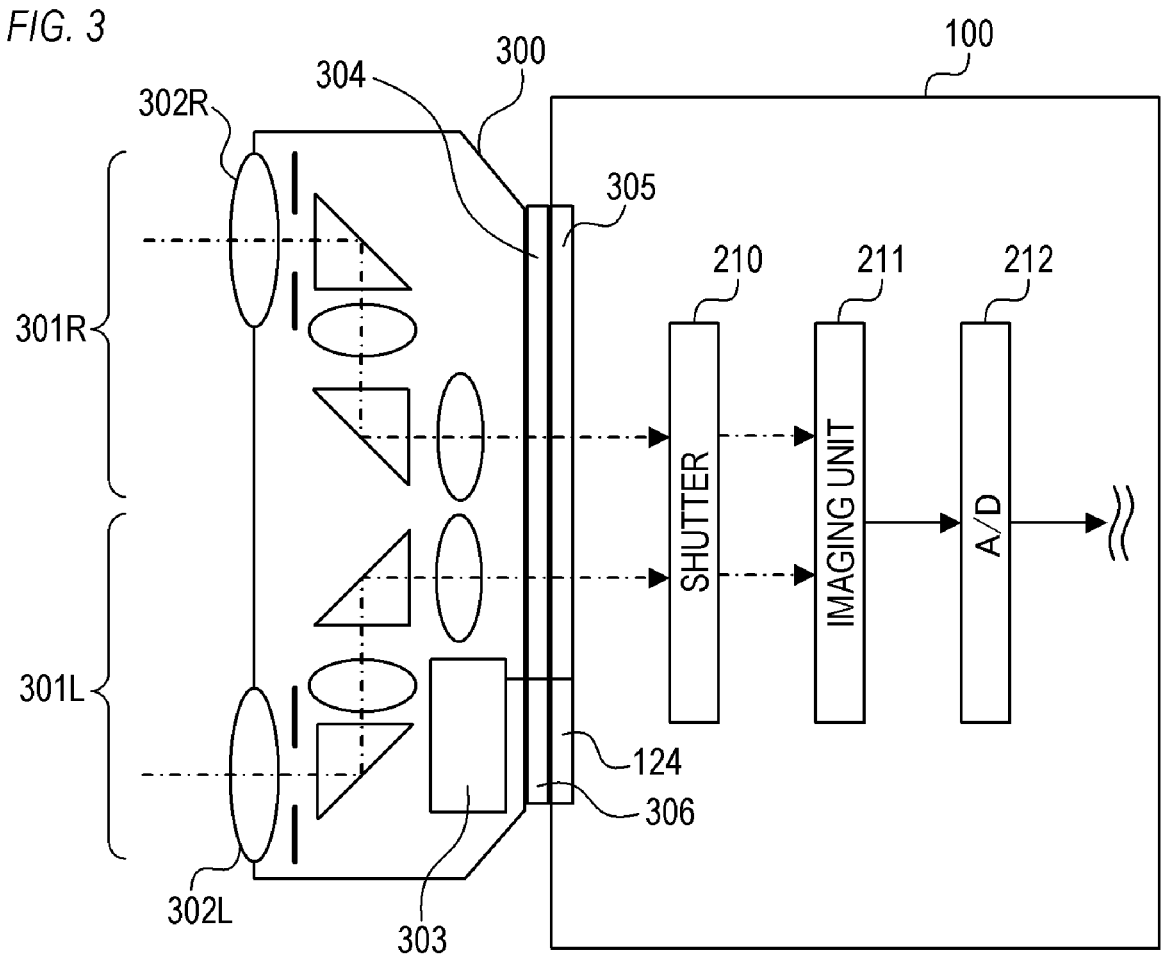
FIG. 3 schematically illustrates a lens unit.

FIG. 3 is a schematic diagram of an exemplary configuration of the lens unit 300. FIG. 3 shows the lens unit 300 mounted on the camera 100. As the lens unit 300 is mounted, the camera 100 can capture a single image (still or moving image) that includes two image areas with a prescribed parallax. In the camera 100 shown in FIG. 3, the same elements as those described in FIG. 2 are denoted by the same reference characters as those in FIG. 2, and their description will not be provided as appropriate.

The lens unit 300 is an interchangeable type lens unit that can be attached to and detached from the camera 100. The lens unit 300 is a dual-lens unit capable of capturing right and left images with a parallax. The lens unit 300 has two optical systems (photographic lenses), and each of the two optical systems can capture an image in a viewing angle range as wide as approximately 180 degrees. Specifically, each of the two optical systems of the lens unit 300 can image an object with a field of view (angle of view) of 180 degrees in the left-right direction (horizontal angle, azimuth angle, yaw angle) and 180 degrees in the vertical direction (vertical angle, elevation angle, pitch angle). In other words, each of the two optical systems can capture an image in the range of the front hemisphere.

The lens unit 300 has a right-eye optical system 301R including multiple lenses and reflecting mirrors, a left-eye optical system 301L including multiple lenses and reflecting mirrors, and a lens system control circuit 303. The right-eye optical system 301R has a lens 302R positioned on the object side, and the left-eye optical system 301L has a lens 302L positioned on the object side. The lens 302R and lens 302L are oriented in the same direction and their optical axes are substantially in parallel. The right-eye optical system 301R and the left-eye optical system 301L each have a fisheye lens and form a circular optical image on the imaging unit 211. The optical image formed through the right-eye optical system 301R (right image) and the optical image formed through the left-eye optical system 301L (left image) are formed on the imaging surface of the single imaging unit 211, and the imaging unit 211 acquires one image including the image areas of the optical images.

The lens unit 300 is a dual-lens unit (VR180 lens unit) for obtaining VR180 images, which is one of the VR (Virtual Reality) image formats that enable binocular stereoscopic vision. The lens unit 300 has a fisheye lens capable of capturing an image in approximately a 180-degree range in each of the right-eye optical system 301R and left-eye optical system 301L. The range that can be captured by the lenses of each of the right-eye optical system 301R and the left-eye optical system 301L may be about 160 degrees, which is smaller than the 180-degree range. The lens unit 300 can form the right image formed through the right-eye optical system 301R and the left image formed through the left-eye optical system 301L on one or two image sensors of the camera to which the lens unit 300 is mounted. In the camera 100, the right image and the left image are formed on one imaging sensor to generate a single image (dual-lens image) having a right image area corresponding to the right image and a left image area corresponding to the left image in side-by-side arrangement. The dual-lens image includes the right image area, the left image area, and an area that does not correspond to the optical image (black area).

The lens unit 300 is mounted to the camera 100 through the lens mount 304 and the camera mount 305 of the camera 100. In this way, the system control unit 50 of the camera 100 and the lens system control circuit 303 of the lens unit 300 are electrically connected through the communication terminal 126 of the camera 100 and the communication terminal 306 of the lens unit 300.

In FIG. 3, the right image formed through the right-eye optical system 301R and the left image formed through the left-eye optical system 301L are formed side by side and formed on the imaging unit 211 of the camera 100. In other words, the right-eye optical system 301R and the left-eye optical system 301L form two optical images in the two areas of one image sensor. The imaging unit 211 converts the formed object images (optical signals) into analog electrical signals. Using the lens unit 300 in this way, a single image (dual-lens image) including two image areas with a parallax can be acquired from the two locations (optical systems), the right-eye optical system 301R and the left-eye optical system 301L. By dividing the acquired image into an image for the left eye and an image for the right eye and displaying the VR image, the user can view a stereoscopic VR image about in a 180-degree range. In other words, the user can view VR180 image stereoscopically.

In the case of a normal single-lens unit, an image (optical image) incident on the lens unit is inverted point-symmetrically around the optical axis of the lens unit and input to an image sensor. An imaging device such as the camera 100 can generate an image with no sense of unnaturalness (not inverted) by controlling the order in which signals are read from the image sensor or by performing inversion processing to the read signals (images). In the case of a dual-lens unit, the image is inverted vertically and input to the image sensor, but the image is not inverted left-right direction. Therefore, while the left image incident through the left-eye optical system is placed on the left side, and the right image incident through the right-eye optical system is placed on the right side, the left and right images are input to the image sensor. Therefore, if the same inversion processing as the single-lens unit is performed, the left and right side in the camera 100 and the left and right images after the inversion processing are opposite. In other words, in the generated image, the left image area corresponding to the left image is placed on the right side and the right image area corresponding to the right image is placed on the left side.

Here, a VR image refers to an image that can be displayed in VR as will be described and includes for example an omnidirectional image (360-degree image) captured by an omnidirectional camera (360-degree camera) and a panoramic image that has a wider image range (valid image range) than the display area that can be displayed at a time on the display unit. VR images are not limited to still images, but also include moving images, and live images (images acquired from a camera substantially in real time). The VR image has an image range (valid image range) for a field of view of 360 degrees in the left-right direction and 360 degrees in the vertical direction at the maximum. The VR image may have a wider angle of view than can be captured by a normal camera or a wider image range than can be displayed on the display unit at one time when the image has a range less than 360 degrees in the left-right direction and less than 360 degrees in the vertical direction. The image captured by the camera 100 using the lens unit 300 described above is a type of VR image. A VR image can be displayed in VR by setting the display mode of the display device (a display device capable of displaying VR images) to "VR view." A certain range of a VR image with a 360-degree angle of view may be displayed, and the user can move the displayed range by changing the orientation of the display device in the left-right direction (horizontal rotation direction), so that a seamless omnidirectional image in the left-right direction can be viewed.

VR display (VR view) is a display method (display mode), according to which a VR image in the viewing range according to the orientation of the display device is displayed, so that the display range can be changed. VR display includes "monocular VR display (monocular VR view)" which displays a single image with deformation (distortion correction) which maps a VR image to a virtual sphere. VR display also includes "binocular VR display (binocular VR view)," in which a VR image for the left eye and a VR image for the right eye are displayed side by side in the left and right areas by performing deformation that maps the images to a virtual sphere. Using "binocular VR display" with a VR image for the left eye and the right eye that have a parallax with each other, the VR image can be viewed stereoscopically. In any kind of VR display, when for example the user wears a display device such as a head-mounted display (HMD), images in the field of view range corresponding to the direction of the user's face are displayed. For example, assume that at a certain time point, the VR image displays an image with a viewing range centered on 0 degrees in the left-right direction (a specific orientation, e.g., north) and 90 degrees in the vertical direction (90 degrees from the zenith, i.e., horizontal). If the orientation of the display unit is reversed from this state (when for example the direction in which the display surface face is changed from south to north), the display range of the same VR image is changed to the viewing range centered on 180 degrees in the left-right direction (opposite orientation, e.g., south) and 90 degrees in the vertical direction. In other words, when the user turns his/her face from north to south (i.e., turns back) while wearing the HMD, the image displayed on the HMD is also changed from the north image to the south image. The VR image captured using the lens unit 300 is a VR180 image (180° image) that has captured the range of about 180° in the front, and there is no image about in the range of 180° in the rear. When such a VR180 image is displayed in VR and the orientation of the display device is changed to the side where no image exists, a blank area is displayed.

By displaying a VR image in this way, the user can visually feel as if he/she is in the VR image (in the VR space) (sense of immersion). The method for displaying VR images is not limited to changing the orientation of the display device. For example, the display range may be moved (scrolled) in response to user operation via a touch panel or directional buttons. In addition to changing the display range by changing the orientation during VR display (in the "VR View" display mode), the display range may be moved in response to Touch Move on the touch panel, dragging operation for example with a mouse device, or pressing the directional buttons. A smartphone mounted to VR goggles (a head-mounted adapter) is a kind of HMD.

As described above, a dual-lens image captured through the lens unit 300 in the camera 100 includes a right image area corresponding to a right image input to the imaging unit 211 via the right-eye optical system and a left image area corresponding to a left image input to the imaging unit 211 through the left-eye optical system. According to the first embodiment, it is assumed that circumferential fisheye display which displays circumferential fisheye image areas as the right image area and the left image area, and equirectangular (conversion) display which displays equirectangular image areas as the right image area and the left image area are enabled. In the case of equirectangular conversion display, equirectangular conversion (conversion from a circumferential fisheye image to an equirectangular image) is required.

Figure 4:
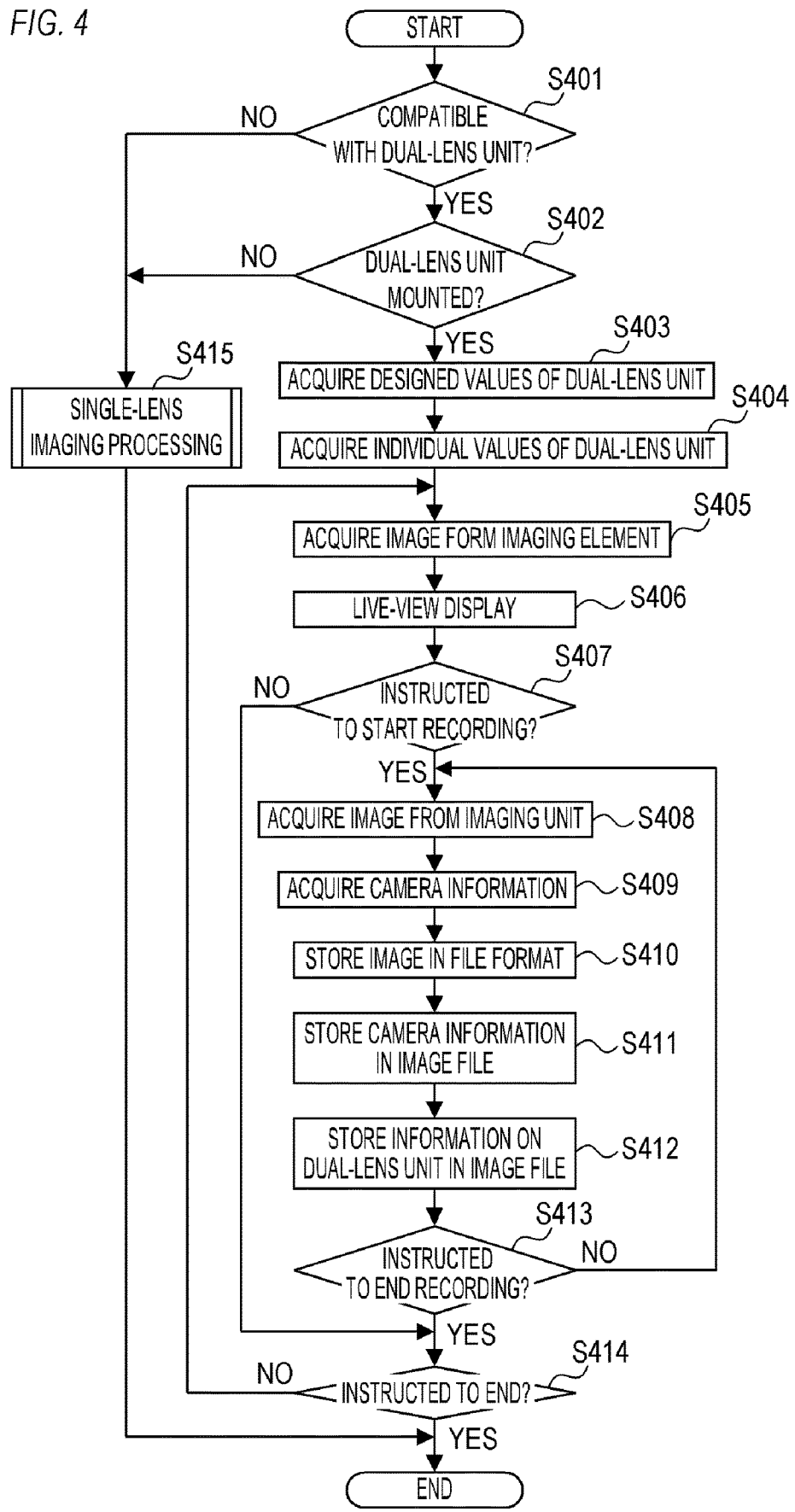
FIG. 4 is a flowchart for illustrating shooting mode processing.

FIG. 4 is a flowchart for illustrating exemplary operation by the camera 100 in the shooting mode (shooting mode processing). The operation is performed as the system control unit 50 deploys a program recorded in the nonvolatile memory 219 to the system memory 218 and executes the program. For example, when the camera 100 is activated in the shooting mode or the mode of the camera 100 is switched to the shooting mode, the operation shown in FIG. 4 starts.

In step S401, the system control unit 50 determines whether the camera 100 is compatible with a dual-lens unit (such as the lens unit 300). For example, the system control unit 50 determines whether the version of the firmware of the system control unit 50 is compatible with the dual-lens unit. If it is determined that the version is compatible with the dual-lens unit, the process proceeds to step S402, but otherwise the process proceeds to step S415. According to the first embodiment, in the case of a dual-lens unit, unlike the case of a normal single-lens unit, it is necessary to acquire and record information on the dual-lens unit (lens information which is information on the two optical systems of the dual-lens unit) for post processing. Therefore, the processing in step S401 is necessary.

In step S402, the system control unit 50 determines whether the dual-lens unit is mounted to the camera 100. If it is determined that the dual-lens unit is mounted, the process proceeds to step S403, but otherwise the process proceeds to step S415. If the dual-lens unit is newly mounted from a non-mounted state, the process also proceeds to step S403. If the dual-lens unit is removed and then the single-lens unit is mounted, the process proceeds to step S415.

In step S403, the system control unit 50 acquires designed values of the dual-lens unit mounted (connected) thereto from the dual-lens unit. The designed values are design parameters and are used for the left-right reversal and equirectangular conversion that will be described. For example, the image circle position, the image circle diameter, the angle of view, and the distortion correction coefficient shown in FIG. 6B are acquired.

In step S404, the system control unit 50 acquires individual values of the dual-lens unit mounted (connected) thereto from the dual-lens unit. The individual values are parameters unique to the lens unit such as an error in manufacturing. For example, the image circle position shift, the optical axis tilt, and the image magnification deviation shown in FIG. 6B are acquired. By using the individual values, image processing can be performed more precisely than the case of using only the designed values.

In step S405, the system control unit 50 acquires images from the imaging unit 211 (image sensor).

In step S406, the system control unit 50 displays the image acquired in step S405 on the EVF 217 or the display unit 108 (live view display).

In step S407, the system control unit 50 determines whether the user has given a recording start instruction. If it is determined that a recording start instruction has been given, the process proceeds to step S408, but otherwise to step S414. The live view display on the EVF 217 or the display unit 108 continues until the recording start instruction or an end instruction in step S414 that will be described is given.

The recording start instruction is given for example by fully pressing the shutter button 101. The recording start instruction may be an instruction to execute still image capture or to start moving image capture. The image to be captured may be a JPEG still image, an MP4 moving image, a RAW still image, or a RAW moving image. During recording of a moving image, the recorded moving image may be displayed on the EVF 217 or the display unit 108 as in live view display.

In step S408, the system control unit 50 acquires an image from the imaging unit 211 (image sensor).

In step S409, the system control unit 50 acquires shooting information such as a shutter speed and an aperture at the time of shooting and orientation information detected by the orientation detection unit 222 at the time of shooting. When a RAW image is taken, data necessary for development (parameters) are also acquired.

In step S410, the system control unit 50 stores the data (image data) on the image acquired in step S408 in a file format in the recording medium 227 (storage medium).

In step S411, the system control unit 50 stores the information acquired in step S409 (information on the camera 100) in the image file stored in step S410. As a result, the information acquired in step S409 is added as metadata to the image data acquired in step S408 in the image file.

In step S412, the system control unit 50 stores the information acquired in steps S403 and S404 (dual-lens unit information) in the image file stored in step S410. As a result, in the image file, the information acquired in steps S403 and S404 is added as metadata to the image data acquired in step S408.

In step S413, the system control unit 50 determines whether the user has given a recording end instruction. If it is determined that the recording end instruction has been given, the process proceeds to step S414, but otherwise to step S408. By repeating the processing from step S408 to step S413, frames of moving images can be recorded one after another in a moving image file, or rapid shooting of still images (serial shooting) can be performed.

In the case of still image capture, the recording end instruction is given by releasing the fully pressed shutter button 101. If the shutter button 101 is pressed all the way down and released within a prescribed time, a single still image is taken, and if the shutter button 101 is pressed all the way down for a prescribed time or longer, a series of still images is taken. In the case of taking a single still image, a single full press of the shutter button 101 may also serve as both a recording start and end instruction. In the case of moving image recording, the end-of-recording instruction is a full press of the shutter button 101. For example, full pressing of the shutter button 101 starts recording a moving image, and when the shutter button 101 is pressed all the way down again, the moving image recording ends.

In step S414, the system control unit 50 determines whether an end instruction has given by the user. If it is determined that an end instruction has been given, the operation shown in FIG. 4 ends, but otherwise the process proceeds to step S405. An end instruction is an instruction to turn off the camera 100 or to switch the mode of the camera 100 from one shooting mode to another. In other words, the end instruction is given by pressing the power supply switch 102 or the mode selector switch 103.

When a single-lens unit is mounted to the camera 100, the processing in step S415 is performed. In step S415, the system control unit 50 performs imaging (shooting) using the single-lens unit (single-lens imaging processing). The operation of the single-lens imaging processing is the same as the conventional imaging (shooting) operation in a camera equipped with a single-lens unit, and a detailed description thereof is not provided. According to the first embodiment, it is assumed that when the system control unit 50 records an image file of an image captured by the single-lens unit in the recording medium 227, information (such as designed values and individual values) about the single-lens unit is acquired from the single-lens unit and stored in the image file.

Figure 5:
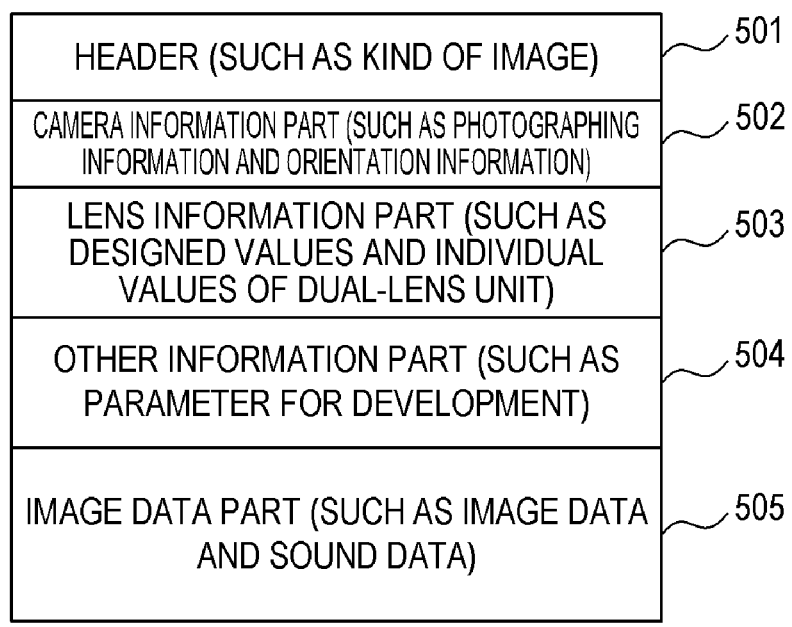
FIG. 5 is a schematic view of the structure of an image file.

FIG. 5 is a schematic diagram of an exemplary structure of an image file captured by a dual-lens unit. The image file in FIG. 5 has a header 501, a camera information part 502, a lens information part 503, another information part 504, and an image data part 505. The header 501 records information such as the type of the taken image. In the camera information part 502, information on the camera used for shooting is recorded as metadata. For example, information such as a shutter speed and an aperture at the time of shooting and camera orientation information at the time of shooting are recorded. In the lens information part 503, information on the dual-lens unit used for shooting is recorded as metadata. For example, the designed values and individual values of the dual-lens unit are recorded. Other kinds of information are recorded as metadata in the information part 504. For example, in the case of moving images, information that changes between frames is recorded. In the case of RAW images, data necessary for development is recorded. Image data is recorded in the image data part 505. In the case of moving images, not only image data but also sound data is recorded. Although the camera information, the dual-lens unit information, and other kinds of information are recorded in the same image file in the above example, these kinds of information may be recorded in separate files associated with the image file.

FIG. 6A is a schematic diagram of exemplary lens information to be acquired from the dual-lens unit. The lens information may include the following information.
1. Lens designed values
2. Individual lens values
3. Lens flag
4. Lens focal length
5. Lens temperature The lens designed values are designed values for aberration correction. Errors such as lens eccentricity and tilt occur in each of the two optical systems (the left-eye optical system 301L and the right-eye optical system 301R) in the manufacturing of the dual-lens unit. If left-right reversal or equirectangular conversion is performed without considering the errors, the quality of binocular VR display may be lowered, and good stereoscopic vision may not be available. The individual lens values are measurement results of errors detected in the manufacturing of the dual-lens unit. The lens designed values and individual lens values will be described in detail with reference to FIG. 6B.

The lens flag indicates that the lens is a dual-lens unit and can be used to determine whether a dual-lens unit has been used. The lens focal length is the distance from the "principal point," which is the center of the lens, to the image sensor (image forming position). The lens focal length may be or may not be a common parameter for the two optical systems of the dual-lens unit (the left-eye optical system 301L and the right-eye optical system 301R). A detailed (highly precise) lens focal length is required in order to perform left-right reversal and equirectangular conversion with high precision and high quality binocular VR display. The lens temperature is the temperature of the dual-lens unit and is used to determine for example the ambient temperature at the time of shooting.

FIG. 6B schematically indicates details of the lens designed values and the individual lens values. According to the first embodiment, the lens designed values and the individual lens values are used for left-right reversal and equirectangular conversion.

The lens designed values may include the following values.
1. Image circle position
2. Image circle diameter
3. Angle of view
4. Distortion correction coefficient The image circle position corresponds to the coordinates of the optical axis center of the optical system in the image to be captured, and is provided for each of the two optical systems of the dual-lens unit (the left-eye optical system 301L and the right-eye optical system 301R). In other words, the image circle position corresponds to the center coordinates of the image circle (circumferential fisheye image) formed on the image sensor, and is provided for each of the right image and the left image. The origin of the coordinates is, for example, the center of the image sensor (the center of the image to be captured). The image circle position includes coordinates in the horizontal and vertical directions. Various kinds of information on the optical axis center of each of the optical system in the image to be captured can be used as the image circle position. For example, the distance from a prescribed position in the image (such as the center and an upper left corner) to the optical axis center can be used.

The image circle diameter is the diameter of the image circle (circumferential fisheye image) formed on the image sensor. The angle of view is the angle of view of the image circle (circumferential fisheye image) formed on the image sensor. The distortion correction coefficient is the ratio of the design image height to the ideal image height of the lens. A distortion correction coefficient may be set for each image height, and for image heights for which no distortion correction coefficient is set, the distortion correction coefficient may be calculated by an interpolation operation using multiple distortion correction coefficients. A polynomial equation that approximates the relationship between image heights and distortion correction coefficients may be set. The image circle diameter, the angle of view, and the distortion correction coefficient may be or may not be common parameters for the two optical systems of the dual-lens unit (the left-eye optical system 301L and the right-eye optical system 301R).

When a circumferential fisheye image is displayed, the camera 100 may display a magic window on the circumferential fisheye image. The magic window is a display item that indicates the area that is (first) cropped out for VR display. For example, the magic window is displayed on the basis of the image circle position, the image circle diameter, and the angle of view. In this way, the display quality of the magic window can be improved. In order to properly display the magic window, the camera 100 edits and uses the image circle position, the image circle diameter, and the angle of view as appropriate. For example, the camera 100 may multiply the image circle position or the image circle diameter by a coefficient.

The individual lens values may include the following values.
5. Image circle position shift
6. Optical axis tilt
7. Image magnification deviation These kinds of information are prepared by carrying out measurement about each of the two optical systems of the dual-lens unit (the left-eye optical system 301L and the right-eye optical system 301R).

The image circle position shift is the deviation of the center coordinates of the image circle (circumferential fisheye image) formed on the image sensor from the designed values. For example, the image circle position shift includes a horizontal position shift and a vertical position shift. Using the coordinates as the designed values (two-dimensional coordinates including horizontal and vertical coordinates) as the origin, the horizontal position shift from the horizontal coordinates is indicated and the vertical position shift from the vertical coordinates is indicated. The optical axis tilt is the shift of the optical axis direction on the object side from the designed value. For example, the optical axis tilt includes a horizontal position shift and a vertical position shift. The shift in each direction is indicated by an angle. The image magnification deviation is the deviation in the size of the image circle (circumferential fisheye image) formed on the image sensor from the designed value. The deviation is indicated for example as a ratio to the designed value.

The information included in the lens information is not limited to the kinds of information described above. For example, the lens information may include the boundary positions of the right image area and the left image area in the captured image (the positions of the edges of the circumferential fisheye image: the positions indicated for example by the shift amounts 705, 706, 709, and 710 in FIG. 7A). The lens information may include the midpoint coordinates between the right image area and the left image area in the captured image. In many cases, the midpoint coordinates coincide with the center coordinates of the captured image. The lens information may include information indicating the area of the magic window (such as the coordinates of the upper left corner of the magic window, the width of the magic window, and the height of the magic window). The lens information may include correction data (such as correction values acquired by calibrating the dual-lens unit) to improve the accuracy of left-right reversal and equirectangular conversion.

FIG. 6C schematically illustrates exemplary camera information generated in the camera. For example, the camera information is used for high-quality VR display. The camera information may include the following information.

1. Camera recording area information
2. In-camera accelerometer information
3. Right exposure correction information.

The camera recording area information is information on a valid image area. The valid image area that can be displayed varies depending on the sensor of the camera and the recording mode. The camera 100 uses the camera recording area information for more accurate display. The in-camera accelerometer information is orientation information acquired using an accelerometer (level) in the camera and represents the orientation of the camera for example in the roll direction and the pitch direction. The camera 100 uses the in-camera accelerometer information to determine the orientation of the camera during shooting. The camera 100 performs electronic vibration isolation and horizontal correction (zenith correction to approximate the vertical direction of the display to the vertical direction in real space) on the basis of the determined orientation. The right exposure correction information is an exposure setting value to approximate the exposure of the right image to that of the left image. The camera 100 uses the right exposure correction information in order to provide a binocular VR display with no (reduced) sense of unnaturalness.

Figure 7A:
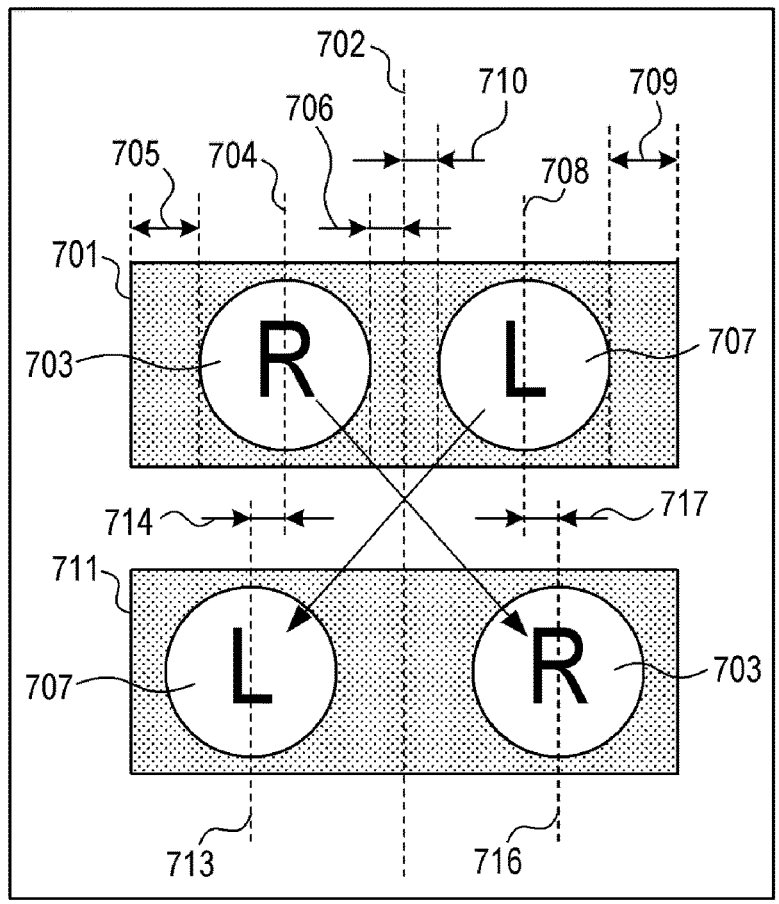
FIGS. 7A and 7B illustrate how the left part and the right part are reversed.
Figure 7B:
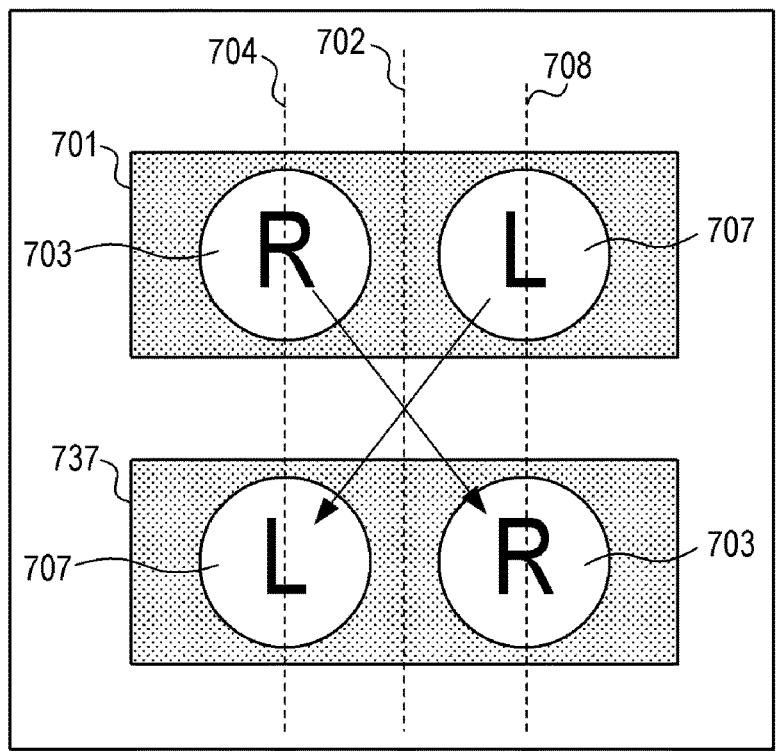

FIGS. 7A and 7B are schematic views of left-right reversal. FIG. 7A shows the conventional left-right reversal without using the dual-lens unit information. FIG. 7B shows the left-right reversal using the information on the dual-lens unit according to the first embodiment.

As shown in FIGS. 7A and 7B, in the image 701 before left-right reversal, the right image area 703, which is the area of the circumferential fisheye image, is located on the left side, and the left image area 707, which is the area of the circumferential fisheye image, is on the right side.

In FIG. 7A, the image 701 is divided into the left half image area and the right half image area along the center coordinates 702 of the image 701, and the left half image area and the right half image area are reversed. In other words, the left half image area is moved to the right side of the right half image area. The image 711 is the image acquired as the result of the left-right reversal.

In FIG. 7A, the shift amount 706 is smaller than the shift amount 705. In other words, in the image 701, the right image area 703 is shifted to the center of image 701 from the center of the left half of image 701. Similarly, the shift amount 710 is smaller than the shift amount 709. In other words, in image 701, the left image area 707 is shifted to the center of image 701 from the center of the right half of image 701. Therefore, in image 711, the center coordinates 713 of the left image area 707 in the left-right direction are shifted by a distance 714 from the center coordinates 704, and the center coordinates 716 of the right image area 703 in the left-right direction are shifted by a distance 717 from the center coordinates 708.

The center coordinates 704 are the center coordinates of the right image area 703 in the image 701 before the left-right reversal, and the center coordinates 708 are the center coordinates of the left image area 707 in the image 701 before the left-right reversal. Before the left-right reversal, the shift amount 705 is the distance from the left edge of the captured image to the left edge of the right image area, and the shift amount 706 is the distance from the center of the captured image to the right edge of the right image area. After the left-right reversal, the shift amount 705 should be the distance from the left edge of the captured image to the left edge of the left image area, and the shift amount 706 should be the distance from the center of the captured image to the right edge of the left image area. Similarly, before the left-right reversal, the shift amount 709 is the distance from the right edge of the captured image to the right edge of the left image area, and the shift amount 710 is the distance from the center of the captured image to the left edge of the left image area. After the left and right reversal, the shift amount 709 should be the distance from the right edge of the captured image to the right edge of the right image area, and the shift amount 710 should be the distance from the center of the captured image to the left edge of the right image area.

According to the first embodiment, by using the lens information, the center coordinates of the left image area 707 in the left-right direction can be matched to the center coordinates 704 in the image 737 (FIG. 7B) after the left-right reversal. Similarly, the center coordinates of the right image area 703 in the left-right direction can be matched to the center coordinates 708.

Figure 8A:
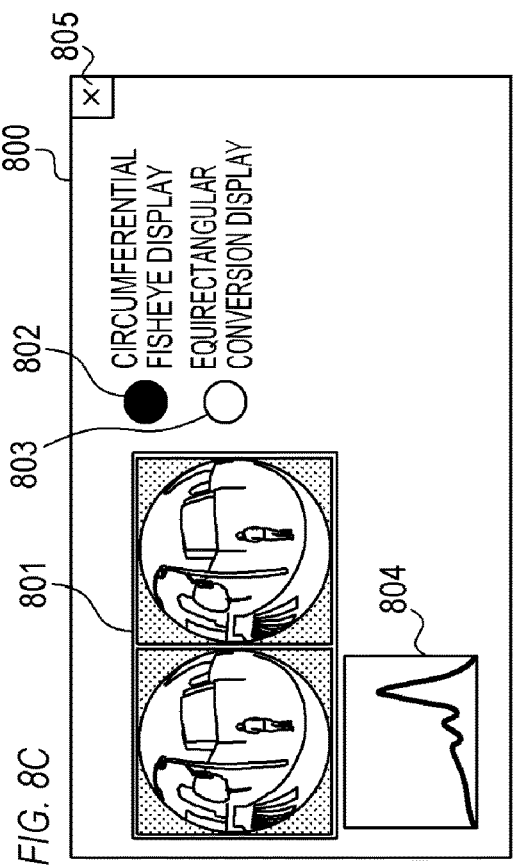
FIGS. 8A to 8D are schematic views for illustrating histogram display processing according to a first embodiment of the invention.
Figure 8C:
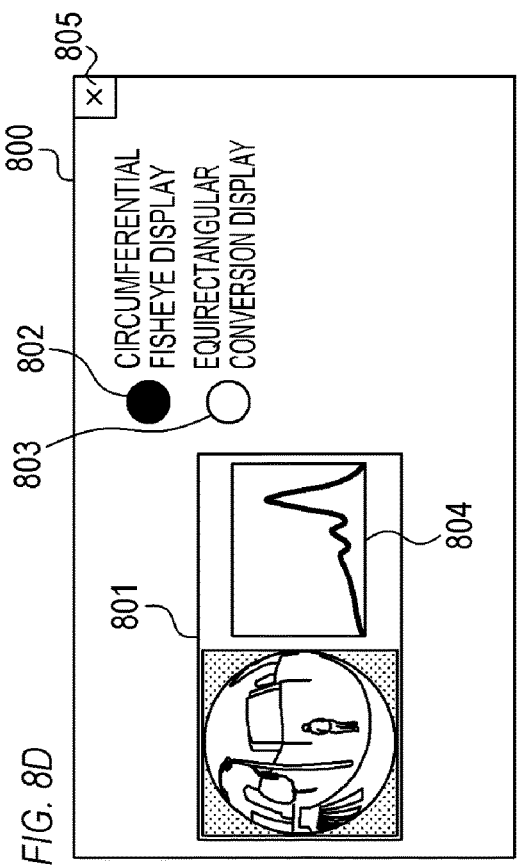
Figure 8B:
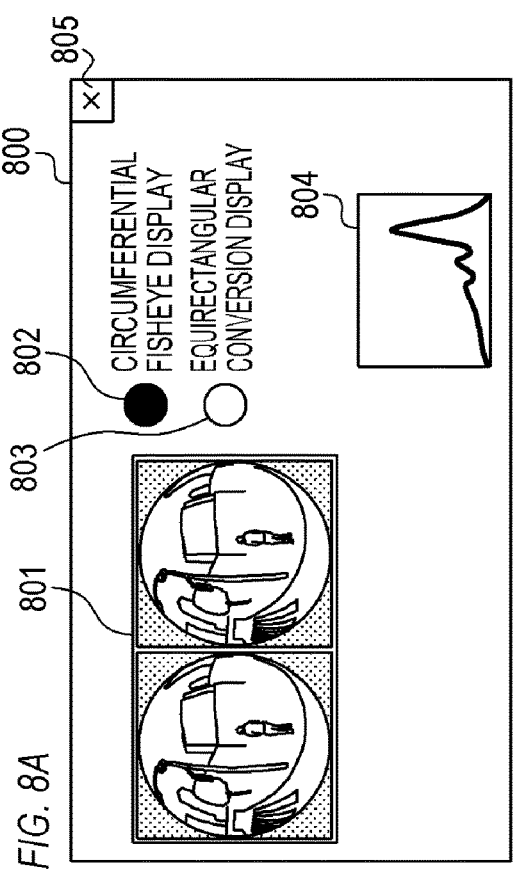

FIGS. 8A and 8B each schematically illustrate an exemplary histogram display in the playback mode. The histogram display is on a display 28 or an EVF 29. FIG. 8A shows circumferential fisheye display, and FIG. 8B shows equirectangular conversion display.

The screen 800 in FIG. 8A includes an image 801, radio buttons 802 and 803, a histogram 804, and an exit button 805. The image 801 is a photographed image and an image after the left-right reversal. The radio button 802 is selected for circumferential fisheye display, and the radio button 803 is selected for equirectangular conversion display. When the radio button 802 is selected, the radio button 803 attains a non-selected state as shown in FIG. 8A, and the image 801 including the areas of the circumferential fisheye images as the right and left image areas is displayed (circumferential fisheye display). When radio button 803 is selected, the radio button 802 attains a non-selected state as shown in FIG. 8B, and equirectangular conversion is performed, so that the image 811 including the regions of the equirectangular images as the right and left image areas is displayed (equirectangular conversion display). The exit button 805 is used to end the display on the screen 800.

The histogram 804 is a histogram of the image 801. According to the first embodiment, the histogram 804 is a histogram of the left image area. By checking the histogram 804, the user can determine the characteristic values of the left image area easily and into detail.

Figure 8D:
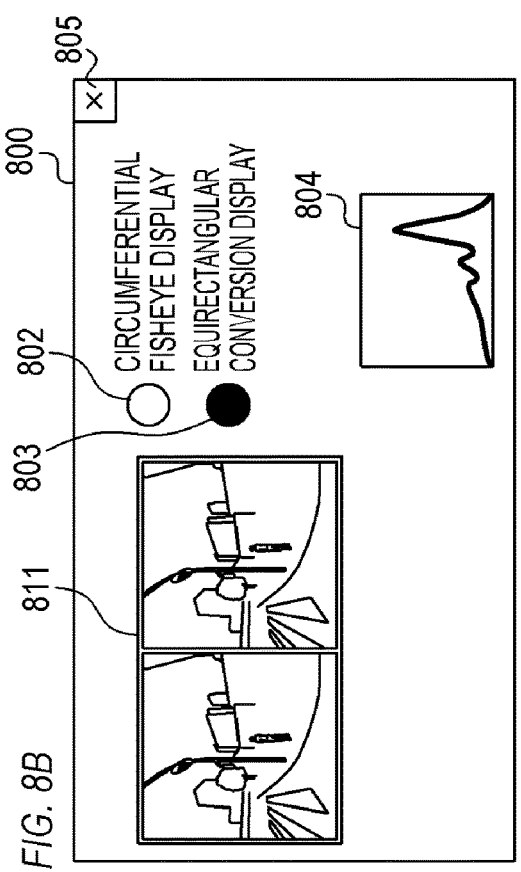

The histogram may be displayed as shown in FIGS. 8C and 8D.

In FIG. 8C, the histogram 804 of the left image area is displayed in association with the left image area. Specifically, the histogram 804 is displayed below the left image area. When the histogram of the right image area is displayed, the histogram is associated with the right image area. The histogram may be displayed for example above the image area corresponding to the histogram.

In FIG. 8D, the histogram 804 of the left image area is displayed in an area that includes at least part of the right image area. Specifically, the histogram 804 is displayed on the left of the left image area, and the right image area is hidden. The right image area continues to be displayed, and the histogram 804 may be overlaid on the right image area. When the histogram of the right image area is displayed, the histogram is displayed in an area that includes at least part of the left image area.

In addition, the left-right reversal may be switchably enabled/disabled. Since the display position of the right image area and the left image area changes depending on whether to enable or disable the left-right reversal, the display position of the histogram 804 shown in FIGS. 8C and 8D also changes accordingly. In the shooting mode, the histogram may be displayed together with the live image by displaying the histogram as shown in FIGS. 8A to 8D.

Figure 9:
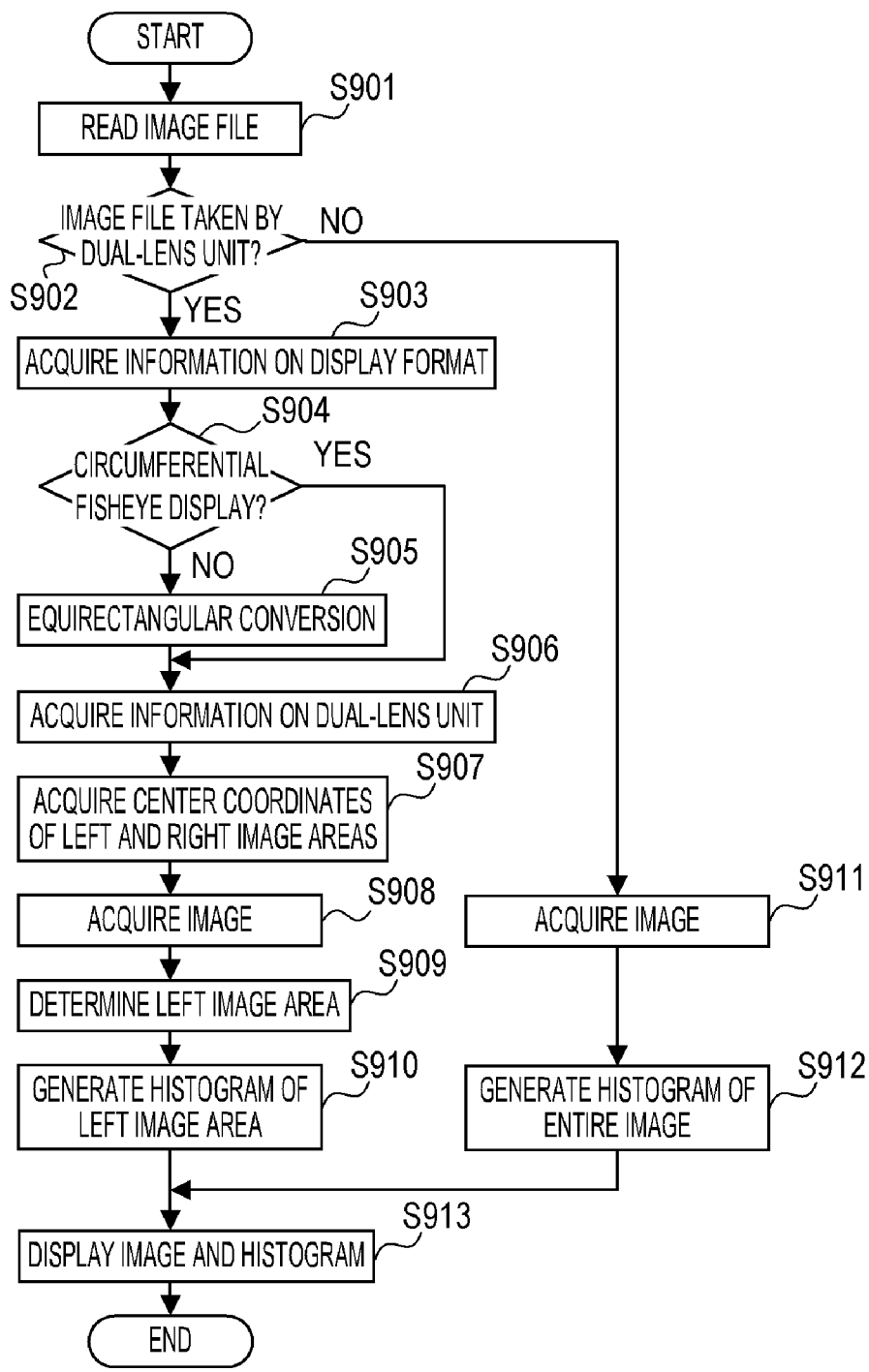
FIG. 9 is a flowchart for illustrating histogram display processing according to the first embodiment.

FIG. 9 is a flowchart for illustrating exemplary histogram display processing performed by the camera 100 in the playback mode. The operation is performed as the system control unit 50 expands the program recorded in the nonvolatile memory 219 to the system memory 218 and executing the program. For example, when the user gives a histogram display instruction in the playback mode, the operation shown in FIG. 9 starts.

In step S901, the system control unit 50 reads an image file selected by the user from the recording medium 227. Here, not only the captured image data, but also the header and metadata attached to the image data are read. For example, the image file shown in FIG. 5 is read.

In step S902, the system control unit 50 determines, on the basis of the image file read in step S901, whether the image file is a file of images captured by the dual-lens unit (using the dual-lens unit). If the file is determined to be a file of images taken with the dual-lens unit, the process proceeds to step S903, but otherwise the process proceeds to step S911. In step S902, it is determined whether the file is a file of images taken with the dual-lens unit on the basis of whether the image file contains information on the dual-lens unit (such as the designed values and the individual value). The file may be determined on the basis of whether the image file includes a flag indicating that the dual-lens unit has been used, rather than detailed information on the dual-lens unit.

In step S903, the system control unit 50 acquires information on the display format of the image. According to the first embodiment, the circumferential fisheye display or the equirectangular conversion display is used as the display of the captured image. Here, information on whether the radio button 802 or the radio button 803 shown in FIGS. 8A to 8D is in the selected state is acquired. When the radio button 802 is selected, the circumferential fisheye display is performed, and when the radio button 803 is selected, the equirectangular conversion display is performed.

In step S904, the system control unit 50 determines whether to perform circumferential fisheye display on the basis of the information acquired in step S903. If it is determined that circumferential fisheye display is to be performed, the process proceeds to step S906, but otherwise (when equirectangular display is to be performed), the process proceeds to step S905.

In step S905, the system control unit 50 subjects right and left images to equirectangular conversion.

In step S906, the system control unit 50 acquires (extracts) information (the designed values and the individual values) about the dual-lens unit from the image file read in step S901.

In step S907, the system control unit 50 acquires the center coordinates of each of the right image area and the left image area in the captured image from the designed values (such as an image circle position) acquired in step S906. The center coordinates of each of the right image area and the left image area correspond to the optical axis center coordinates of each of the two optical systems of the dual-lens unit (the left-eye optical system 301L and the right-eye optical system 301R). For example, the center coordinates 704 and 708 shown in FIGS. 7A and 7B are acquired. When left-right reversal is not performed, the center coordinates 704 are the center coordinates of the right image area in the left-right direction, and the center coordinates 708 are the center coordinates of the left image area in the left-right direction. If the left-right reversal is performed, the center coordinates 704 are the center coordinates of the left image area in the left-right direction, and the center coordinates 708 are the center coordinates of the right image area in the left-right direction.

In step S908, the system control unit 50 acquires image data (captured image) from the image file read in step S901. This image may be before or after left-right reversal. The left-right reversal may be performed during the processing up to step S913.

In step S909, the system control unit 50 determines the left image area (valid area) in the captured image on the basis of the center coordinates acquired in step S907. For example, an area centered around the coordinates based on the optical axis center coordinates (image circle position) of the left-eye optical system 301L and having a diameter based on the image circle diameter of the left-eye optical system 301L (left image) is determined as the left image area.

Depending on the combination of the lens unit and the shooting settings, the right image area and the left image area may have areas unnecessary for stereoscopic viewing based thereon (areas that cannot be used for stereoscopic viewing). For example, some areas in the shooting range may exist in the right image area but not in the left image area, or other areas in the shooting range may exist in the left image area but not in the right image area. In such cases, in step S909, the left image area (valid area) may be determined as the left image area removed of the areas unnecessary for stereoscopic viewing.

Figure 10:
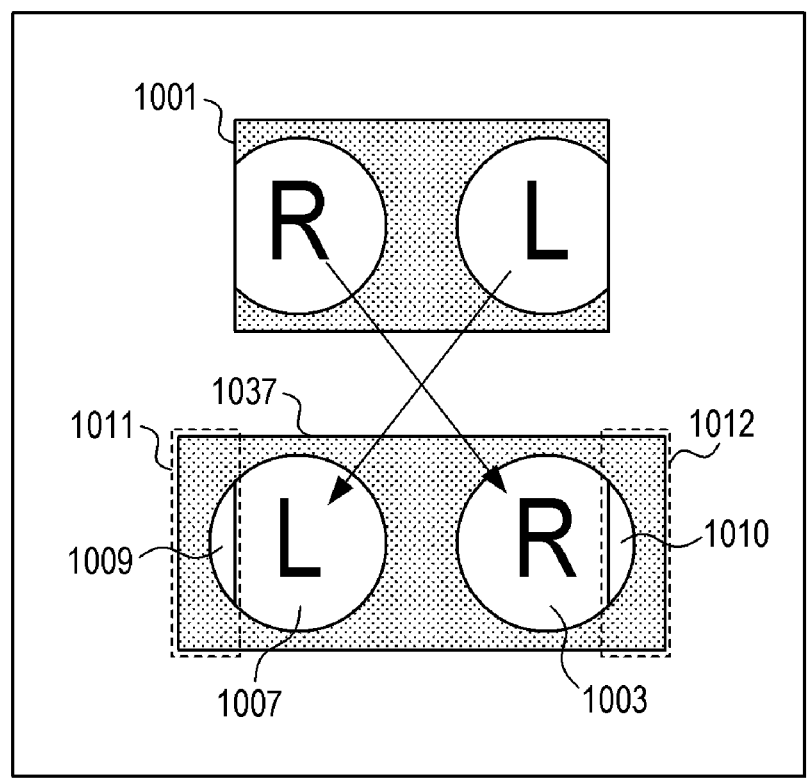
FIG. 10 is a schematic view of a valid region of images.

When a UHD image is captured using a twin-lens unit with a DCI angle of view, which is a type of full-size compatible lens unit, an image 1001 with both left and right ends missing is captured (recorded) as shown in FIG. 10. When an APS-C or Super35 image is taken using the full-size compatible lens unit, an image also with both left and right edges missing is captured (recorded). The image 1001 is converted into an image 1037 by left-right reversal. Areas 1009 and 1010 in the image 1037 are excluded from the valid area because these areas have been captured but cannot be used for stereoscopic viewing for example with an HMD. When the areas 1009 and 1010 are excluded, the left image area (valid area) in the image 1037 becomes an area 1007, and the right image area (valid area) in the image 1037 becomes an area 1003. Note that the areas 1009 and 1010 may be or may not be left in place. For example, the areas 1009 and 1010 may be converted into black areas in prescribed timing, such as when the left and right images are reversed. To ensure that the image size after left-right reversal matches the image size before left-right reversal, the area 1011 including the area 1009 and the area 1012 including the area 1010 may be removed from the image 1037.

The system control unit 50 can for example determine whether the left and right ends of the image are missing or determine areas that are unnecessary for stereoscopic viewing on the basis of the designed value (angle of view of the lens unit) acquired in step S906 and the shooting settings at the time of shooting the image to be played back.

In step S910, the system control unit 50 acquires a characteristic value of the left image area determined in step S909 from the image acquired in step S908 and generates a histogram showing the characteristic value.

In step S911, the system control unit 50 acquires image data (captured images) from the image file read in step S901. Here, the images taken using the single-lens lens unit are acquired.

In step S912, the system control unit 50 acquires a characteristic value from the image acquired in step S911 and generates a histogram showing the characteristic value. Here, for example, a histogram indicating the characteristic value of the entire image is generated.

In step S913, the system control unit 50 displays the captured image and the histogram generated in step S910 or step S912 on the display 28 or the EVF 29.

Although the example of displaying the histogram of the left image area in the dual-lens image has been described, the histogram of the right image area in the dual-lens image may also be displayed. The display format of characteristic values is not limited to histograms, but the display format of the characteristic values may also be a waveform monitor or a vector scope.

As described above, according to the first embodiment, a characteristic value of one of the right image area and the left image area in the dual-lens image is displayed. This allows the user to check the characteristic value of one of the right image area and the left image area in the dual-lens image easily and into detail.

Second Embodiment

The processing for displaying the histogram of the left image area in the dual-lens image according to the first embodiment has been described. According to a second embodiment of the invention, the processing of displaying a histogram of the left image area in a dual-lens image and a histogram of the right image area in the dual-lens image will be described.

FIG. 11 is a flowchart for illustrating exemplary histogram display processing according to the second embodiment. The operation is performed as the system control unit 50 expands a program recorded in the nonvolatile memory 219 to the system memory 218 and executing it. For example, when the user gives a histogram display instruction in the playback mode, the operation shown in FIG. 11 starts. Steps S1101 to S1108 and S1111 to S1113 in FIG. 11 are the same as steps S901 to S908 and S911 to S913 in FIG. 9.

In step S1109, the system control unit 50 determines a left image area (valid area) and a right image area (valid area) in a captured image on the basis of the center coordinates acquired in step S1108. The method of determination is the same as the method according to the first embodiment (step S909).

In step S1110, the system control unit 50 acquires a characteristic value from the image acquired in step S1108 for each of the left image area and the right image area determined in step S1109, and generates a histogram indicating the characteristic value. In other words, a histogram indicating the characteristic value in the left image area and a histogram indicating the characteristic values in the right image area are generated.

Figure 12A:
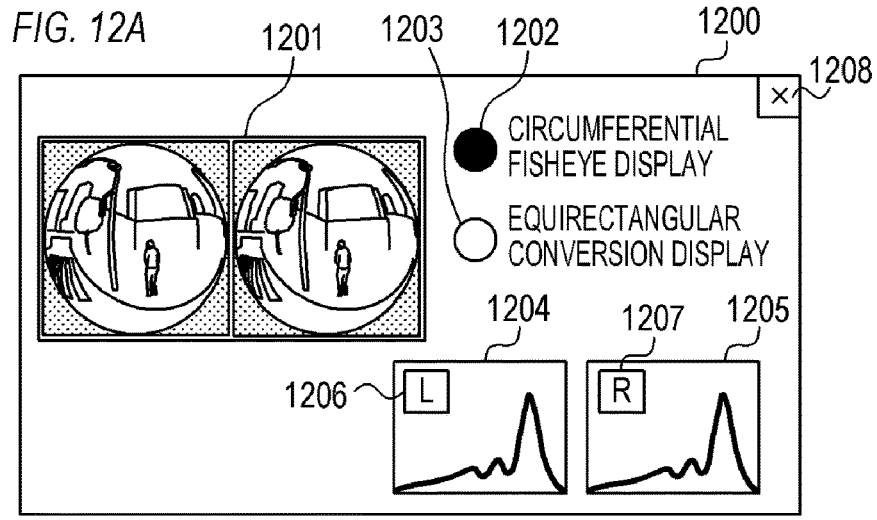
FIGS. 12A to 12C schematically illustrate histogram display according to the second embodiment.
Figure 12B:
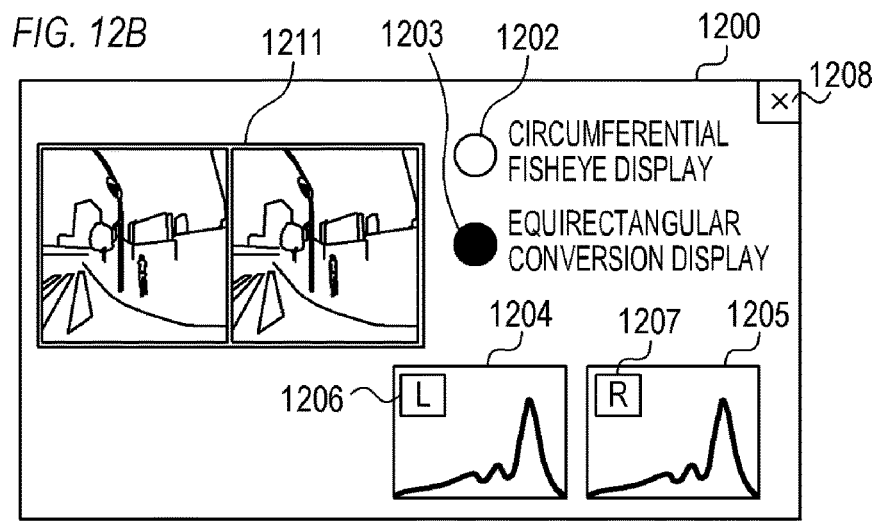

FIGS. 12A and 12B are schematic diagrams showing an example of a histogram display for the second embodiment. The histogram display is on the display 28 or EVF 29. FIG. 12A shows the circumferential fisheye display, and FIG. 12B shows the regular cylindrical conversion display.

The screen 1200 in FIG. 12A includes an image 1201, radio buttons 1202 and 1203, histograms 1204 and 1205, icons 1206 and 1207, and an exit button 1208. The image 1201 is a photographed image having been subjected to the left-right reversal. The radio button 1202 is selected for circumferential fisheye display, and the radio button 1203 is selected for equirectangular conversion display. As shown in FIG. 12A, when the radio button 1202 is selected, the radio button 1203 attains a non-selected state, and the image 1201 including the circumferential fisheye image areas, is displayed as a right image area and a left image area (circumferential fisheye display). As shown in FIG. 12B, when the radio button 1203 is selected, the radio button 1202 attains a non-selected state, equirectangular conversion is performed, and an image 1211 including equirectangular image regions as the right image area and the left image area (equirectangular conversion display). The exit button 1208 is used to end the display on the screen 1200.

The histograms 1204 and 1205 are histograms of the image 1201. According to the second embodiment, the histogram 1204 is the histogram of the left image area and the histogram 1205 is the histogram of the right image area. The user can check the characteristic value of the left image area easily and into detail by checking the histogram 1204. Similarly, the user can check the characteristic value of the right image area easily and into detail by checking the histogram 1205.

The icon 1206 is an icon (item) indicating that the histogram 1204 is a histogram of the left image area. The icon 1207 is an icon (item) indicating that the histogram 1205 is a histogram of the right image area. The user can easily understand that the histogram 1204 is a histogram of the left image area by checking the icon 1206. Similarly, the user can easily understand that the histogram 1205 is a histogram of the right image area by checking the icon 1207.

In FIGS. 12A and 12B, the left-right positional relation between the histogram 1204 and the histogram 1205 corresponds to the left-right positional relation between the left image area and the right image area. In this case, the user can understand the corresponding relationship between the histograms and the image areas even if the icons 1206 and 1207 are not displayed. However, if the icons 1206 and 1207 are displayed, the user can easily understand the corresponding relationship between the histograms and the image areas.

Figure 12C:
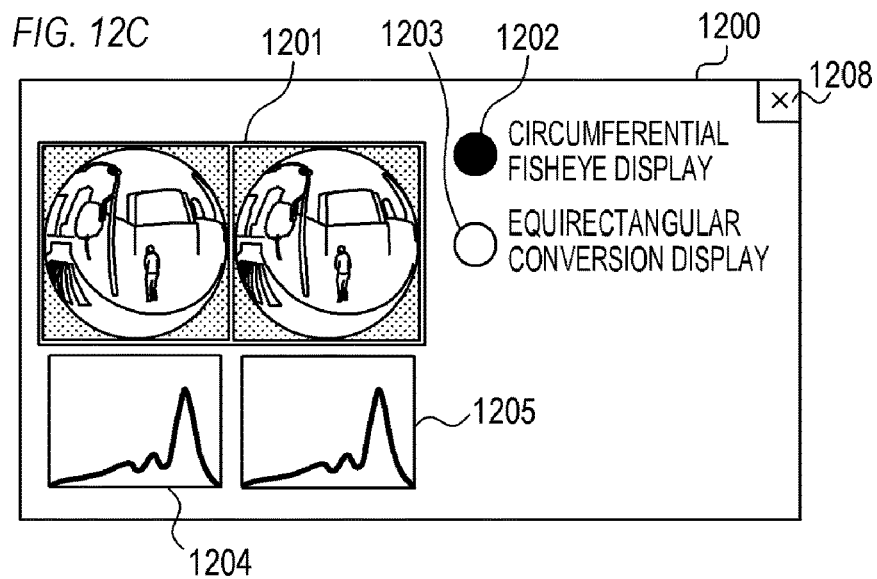

The histograms may be displayed as shown in FIG. 12C. In FIG. 12C, the histogram 1204 for the left image area is displayed in association with the left image area, and the histogram 1205 for the right image area is displayed in association with the right image area. Specifically, the histogram 1204 is displayed below the left image area, and the histogram 1205 is displayed below the right image area. The histograms may also be displayed above the image areas corresponding to the histograms.

Whether to enable or disable the left-right reversal may be switchable. Since the display position of the right image area and the left image area changes depending on whether left-right reversal is enabled or disabled, the display position of histograms 1204 and 1205 also changes accordingly. In the shooting mode, the histograms may be displayed together with live images using the histogram display as shown in FIGS. 12A to 12C.

As described above, according to the second embodiment, the characteristic values of both the right image area and the left image area in the dual-lens image (the characteristic value of the right image area in the dual-lens image and the characteristic value of the left image area in the dual-lens image) are displayed. This allows the user to check the characteristic values of both the right image area and the left image area easily and into detail in the dual-lens image. This allows the user to change the shooting settings or perform image correction in an appropriate manner (give instructions) when only one of the right image area and the left image area has white or black clippings.

The various kinds of control performed by the system control unit 50 as described above may be performed by a single kind of hardware or multiple kinds of hardware (such as multiple processors or circuits) may share the processing to control the entire device.

Although the embodiments of the invention have been described in detail, the invention is not limited by these specific embodiments, and various forms that may be acquired without departing from the gist of the invention shall also be encompassed by the invention. Furthermore, the above-described embodiments are each only one embodiment of the invention and may be combined as appropriate.

The invention is applicable not only to cameras (imaging devices) but also to any electronic device that can be controlled to display characteristic values of captured images. For example, the invention is applicable to devices such as a PDA, a cell phone terminal, a portable image viewer, a printer device, a digital photo frame, a music player, a game system, and e-book readers. The invention is also applicable to video players, display devices (including projection devices), tablet terminals, smartphones, AI speakers, home appliances and in-vehicle devices. The invention is also applicable to multi-view smartphones and other devices with multiple optical systems of different types, such as a standard lens, a wide-angle lens, and a zoom lens. In any of the cases, stereoscopic images can be acquired if the focal lengths (zoom magnifications) of the two optical systems used are matched (common focal length) during shooting.

The invention is applicable not only to the main body of the imaging device, but also to a control device that communicates with the imaging device (including a network camera) through wired or wireless communication to remotely control the imaging device. Examples of the devices that remotely control the imaging device may include a smartphone, a tablet PC and a desktop PC. The imaging device can be controlled remotely by notifying the imaging device of commands that cause the imaging device to perform various kinds of operation and settings on the basis of operation or processing performed on the control device side. Live-view images captured by the imaging device can also be received via wired or wireless communication and displayed on the control device side.

According to the present invention, preferred characteristic values based on a captured image can be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-034284, filed on Mar. 7, 2022, which is hereby incorporated by reference herein in its entirety.

What is claimed is:

1. An electronic apparatus comprising:
    a processor; and
    a memory storing a program which, when executed by the processor, causes the electronic apparatus to:
    (1) acquire (a) an image in which a first image area captured through a first optical system and a second image area captured through a second optical system are arranged, (b) information related to the first optical system, and (c) information related to the second optical system;
    (2) determine the first image area in the image from the information related to the first optical system;
    (3) determine the second image area in the image from the information related to the second optical system;
    (4) acquire, from the image, (a) a characteristic value of the determined first image area and (b) a characteristic value of the determined second image area; and
    (5) perform control to display (a) the characteristic value of the first image area and (b) the characteristic value of the second image area.

2. The electronic apparatus according to claim 1, wherein the information related to the first optical system includes information related to an optical axis center of the first optical system in the image.

3. The electronic apparatus according to claim 1, wherein each of the first optical system and the second optical system is a fisheye lens, and
    wherein each of the first image area and the second image area is a circumference fisheye image area.

4. The electronic apparatus according to claim 1, wherein each of the first image area and the second image area is an equirectangular image area.

5. The electronic apparatus according to claim 1, wherein the acquisition of the image, the information related to the first optical system, and the information related to the second optical system is an acquisition of an image file in which the information related to the first optical system and the information related to the second optical system are attached to data of the image as metadata.

6. The electronic apparatus according to claim 1, wherein the image is an image in which the first image area and the second image area are arranged side by side.

7. The electronic apparatus according to claim 1, wherein the determination of the first image area is a determination of an area obtained by removing an area unnecessary for stereoscopic viewing based on the first image area and the second image area from the first image area.

8. The electronic apparatus according to claim 1, wherein the control is performed so that each of the characteristic value of the first image area and the characteristic value of the second image area is indicated in a form of a histogram, a waveform monitor, or a vector scope.

9. The electronic apparatus according to claim 1, wherein the control is performed so that (1) the characteristic value of the first image area and the characteristic value of the second image area are displayed, (2) the characteristic value of the first image area is indicated with an item indicating that the characteristic value is that of the first image area, and (3) the characteristic value of the second image area is indicated with an item indicating that the characteristic value is that of the second image area.

10. An electronic apparatus comprising:
a processor; and
a memory storing a program which, when executed by the processor, causes the electronic apparatus to:
(1) acquire (a) an image in which a first image area captured through a first optical system and a second image area captured through a second optical system are arranged and (b) information related to the first optical system;
(2) determine the first image area in the image from the information related to the first optical system;
(3) acquire a characteristic value of the determined first image area from the image; and
(4) perform control to display the characteristic value,
wherein the control is performed so that the characteristic value is displayed in an area including at least a part of the second image area.

11. The electronic apparatus according to claim 1, wherein the control is performed so that the characteristic value of the first image area is displayed in association with the first image area, and so that the characteristic value of the second image area is displayed in association with the second image area.

12. A control method of an electronic apparatus, the control method comprising:
acquiring (a) an image in which a first image area captured through a first optical system and a second image area captured through a second optical system are arranged,
(b) information related to the first optical system, and (c) information related to the second optical system;
determining the first image area in the image from the information related to the first optical system;
determining the second image area in the image from the information related to the second optical system;
acquiring, from the image, (a) a characteristic value of the determined first image area and (b) a characteristic value of the determined second image area; and
performing control to display (a) the characteristic value of the first image area and (b) the characteristic value of the second image area.

13. A non-transitory computer-readable medium that stores a program, wherein the program causes a computer to execute the control method according to claim 12.

* * * * *